United States Patent
Khalkechev et al.

(10) Patent No.: US 10,713,308 B2
(45) Date of Patent: Jul. 14, 2020

(54) METHOD AND SYSTEM FOR GENERATING AN OFFLINE SEARCH ENGINE RESULT PAGE

(71) Applicant: YANDEX EUROPE AG, Lucerne (CH)

(72) Inventors: Roman Vladimirovich Khalkechev, Kommunaraka village (RU); Andrey Grigorievich Plakhov, Sergiev Posad (RU); Ivan Georgievich Yanikov, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 483 days.

(21) Appl. No.: 15/785,719

(22) Filed: Oct. 17, 2017

(65) Prior Publication Data

US 2018/0285458 A1   Oct. 4, 2018

(30) Foreign Application Priority Data

Apr. 4, 2017   (RU) ................................ 2017111250

(51) Int. Cl.
*G06F 16/951*   (2019.01)
*G06F 16/22*   (2019.01)
*G06F 16/248*   (2019.01)

(52) U.S. Cl.
CPC ............ *G06F 16/951* (2019.01); *G06F 16/22* (2019.01); *G06F 16/248* (2019.01)

(58) Field of Classification Search
CPC .................................................. G06F 16/951
See application file for complete search history.

(56) References Cited

U.S. PATENT DOCUMENTS

| 7,707,142 B1 * | 4/2010 | Ionescu .................. G06F 16/95 707/999.003 |
| 2006/0235829 A1 | 10/2006 | Mirzad et al. |

(Continued)

FOREIGN PATENT DOCUMENTS

| RU | 2560815 C2 | 8/2015 |
| WO | 2014025711 A1 | 2/2014 |

OTHER PUBLICATIONS

Fagni et al., "Boosting the Performance of Web Search Engines: Caching and Prefetching Query Results by Exploiting Historical Usage Data", ACM Transactions on Information Systems, vol. 24, No. 1, 2006, pp. 51-78.

(Continued)

*Primary Examiner* — Van H Oberly
(74) *Attorney, Agent, or Firm* — BCF LLP

(57) ABSTRACT

A method of processing a search query, the method comprising receiving a search query; determining whether the search query is stored in an offline query index by comparing the search query against one or more offline search queries stored therein; responsive to determining that the search query matches a given offline search query, determining an offline SERP template pointer associated with the given offline search query; determining, based on the offline SERP template pointer, an associated offline SERP template stored within an offline SERP template index; retrieving a list of one or more ordered element pointers comprising the associated offline SERP template; retrieving, for each one or more ordered element pointers comprising the list, a respective SERP element, from the at least one SERP elements index; generating an offline SERP by compiling the retrieved SERP elements; and displaying the offline SERP on the electronic device.

18 Claims, 14 Drawing Sheets

(56) References Cited

U.S. PATENT DOCUMENTS

| | | | |
|---|---|---|---|
| 2007/0124693 A1 | 5/2007 | Dominowska et al. | |
| 2007/0271245 A1* | 11/2007 | Repasi | G06F 16/24575 |
| 2008/0021896 A1* | 1/2008 | Turski | G06F 16/285 |
| 2009/0234711 A1 | 9/2009 | Ramer et al. | |
| 2009/0292677 A1 | 11/2009 | Kim | |
| 2012/0284256 A1* | 11/2012 | Mahajan | G06F 16/9537 |
| | | | 707/722 |
| 2013/0297615 A1* | 11/2013 | Stewart | G06F 16/334 |
| | | | 707/741 |
| 2014/0040228 A1* | 2/2014 | Kritt | G06F 16/248 |
| | | | 707/706 |
| 2016/0019219 A1 | 1/2016 | Serdyukov et al. | |
| 2016/0055203 A1 | 2/2016 | Shi et al. | |
| 2016/0055259 A1 | 2/2016 | Ghanekar et al. | |
| 2016/0283593 A1 | 9/2016 | Zhou et al. | |

OTHER PUBLICATIONS

Search Report with regard to the counterpart RU Application 2017111250 completed Jan. 23, 2018.

* cited by examiner

| Offline Query Index | | | 402 |
|---|---|---|---|
| 506 | 516 | 510 | 508 |
| 0 | 0 | [ . . . ] | |
| ... | ... | ... | |
| 32 | 32 | Ha... | |
| | 33 | Habs | 264 |
| 34 | 34 | ... | 272 |
| ... | ... | ... | |
| 66 | 66 | Montreal Canadiens | 528 |
| n | n | n | n |

FIG. 5

| Title Elements Index 406A ||
| --- | --- |
| 614 | 604 |
| 0 | [ . . . ] |
| 1 | [ . . . ] |
| 2 | Amazing Habs |
| 3 | [ . . . ] |
| . . . | [ . . . ] |
| 75 | [ . . . ] |
| 76 | Montreal Canadiens |
| 77 | Montreal Canadiens - wikipedia |
| 78 | [ . . . ] |
| 79 | [ . . . ] |
| 80 | [ . . . ] |
| 81 | [ . . . ] |
| . . . | . . . |

FIG. 6

| Offline SERP Template Index | 408 | |
|---|---|---|
| # 716 | Element pointers | 702 |
| 0 | [...] | |
| ... | ... | |
| 264 | Title_77 | 708A |
| 265 | URL_80 | 708B |
| 266 | Snippet_40 | 708C |
| 267 | Favicon_22 | 708D |
| 268 | Title_2 | |
| 269 | URL_4 | |
| 270 | Snippet_26 | |
| 271 | Favicon_83 | |
| 272 | [...] | |
| ... | ... | |
| 528 | Title_77 | |
| 529 | URL_123 | |
| 530 | Snippet_126 | |
| 531 | Favicon_82 | |
| 532 | Title_73 | |
| 533 | URL_35 | |
| 534 | Snippet_63 | |
| 535 | Favicon_30 | |
| ... | | |

708A–708D braced as 708; rows 264–267 = 708, rows 268–271 = 710, rows 264–271 = 712; rows 528–535 = 714. Arrows: 716A → row 264; 716B → row 528.

FIG. 7

| Partial Offline Query Index | 410 |
|---|---|
| 802 | 804 |
| A A | 0 |
| A B | 4 |
| A C | 6 |
| ... | ... |
| H A | 32 |
| ... | ... |
| M O | 66 |
| ... | ... |

FIG. 8

| Offline SERP Template Index 408 | | |
|---|---|---|
| # | Element pointers | 702 |
| 0 | [...] | |
| ... | ... | |
| 264 | Title_77 | 708A |
| 265 | URL_80 | 708B |
| 266 | Snippet_40 | 708C |
| 267 | Favicon_22 | 708D |
| 268 | Title_2 | |
| 269 | URL_4 | |
| 270 | Snippet_26 | |
| 271 | Favicon_83 | |
| 272 | [...] | |
| ... | ... | |
| 528 | Title_77 | |
| 529 | URL_123 | |
| 530 | Snippet_126 | |
| 531 | Favicon_82 | |
| 532 | Title_73 | |
| 533 | URL_35 | |
| 534 | Snippet_63 | |
| 535 | Favicon_30 | |
| ... | | |

"Start" → 264 (716A)
"Stop" → 272
716B → 528

METHOD AND SYSTEM FOR GENERATING AN OFFLINE SEARCH ENGINE RESULT PAGE

CROSS-REFERENCE

The present application claims priority to Russian Patent Application 2017111250, filed on Apr. 4, 2017, entitled "Method And System For Generating An Offline Search Engine Result Page," the entirety of which is incorporated herein by reference.

FIELD

The present technology generally relates to generating a search engine result page (SERP). More particularly, the present technology relates to a method and system for generating an offline SERP.

BACKGROUND

Various global or local communications networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

Generally speaking, a given user can access a resource via a communications network by two principle means. The given user can access a particular resource directly, either by typing an address of the resource (typically an URL or Universal Resource Locator, such as www.webpage.com) or by clicking a link in an e-mail or in another web resource. Alternatively, the given user may conduct a search using a search engine to locate a resource of interest. The latter is particularly suitable in those circumstances, where the given user knows a topic of interest, but does not know the exact address of the resource she is interested in.

There are numerous search engines available to the user. Some of them are considered to be general purpose search engines (such as Yandex™, Google™ Yahoo!™ and the like). Others are considered to be vertical search engines— i.e. search engines dedicated to a particular topic of search— such as Momondo™ search engine dedicated to searching flights.

Irrespective of which search engine is used, the search engine is generally configured to receive a search query from a user, to perform a search and to return a ranked search results page (SERP) to the user.

For example, looking at FIG. 1, a given user uses the Yandex™ search engine to search for a hockey team. The user may have entered a first search query 502 ("Montreal Canadiens"). The user is presented with a SERP to which a screen shot is depicted in FIG. 1 as a screen shot 100, the SERP depicted at the screen shot 100 being implemented in accordance with known techniques.

Within the screen shot 100, the user is presented with several conventionally-known fields. Amongst these fields are: a query interface 102, and a search results interface 104. The general purpose of the query interface 102 is to enable the user (not depicted) to enter her query or a "search string" (which in this case is "Montreal Canadiens"). The general purpose of the search results interface 104 is to provide search results that are responsive to the user query entered into the query interface 102.

Within the search results interface 104, there is shown a first SERP 106, the first SERP 106 having, amongst other, four search results, namely a first search result 108, which is associated with a Wikipedia™ web resource, a second search result 110 associated with a National Hockey League™ web resource, a third search result 112 also associated with a Wikipedia™ web resource, and a fourth search result 114 associated with a Twitter™ web resource. How the search results are displayed is generally known in the art and will not be discussed at length here. Suffice it to say, as an example only, the first search result 108 comprises a title 116, a uniform resource locator (URL) 118, a snippet 120, and a favicon 122 associated with the Wikipedia™ web resource.

In another example, with reference to FIG. 2, let it be assumed that the user has typed in (using the query interface 102) a second search query 504 ("habs", which is a nickname of the hockey team Montreal Canadiens™). The user is presented with a SERP of which a screen shot is depicted in FIG. 2, generally depicted at 200. Within the screen shot 200, the user is presented with several conventionally-known fields. Amongst these fields are: the query interface 102 and the search results interface 104. Within the search results interface 104 there is shown a second SERP 206, the second SERP 206 having, amongst other, three search results, namely a first search result 208 associated with a Wikipedia™ web resource, a second search result 210 associated with a web resource associated with amazinghabs.com, and a third search result 212 associated a web resource associated with allabouthockey.com. The first search result 208 comprises a title 216, a URL 218, a snippet 220, and a favicon 222 associated with Wikipedia™.

Needless to say, a communication network connection must be maintained between the client device and the search engine server in order for the search engine server to receive queries and transmit the search results to the client device. As such, in certain circumstances where there is no connection (or there is a high latency associated with slow(er) connection), the search engine may not effectively receive the inputted search query, or effectively transfer the generated SERP to the client device for display, which can cause user dissatisfaction, to say the least.

Generally speaking, there exist a few computer-based approaches to generating an offline SERP on the client device. For example, a simple approach is to use a cache of a browser application of the client device. However, the use of the cache is limited to previously submitted search queries and may not be used if the inputted search query is different from the previously submitted search query.

US 2016/0055203 provides various techniques for offline record selection to avoid negatively impacting latency. In one embodiment, a method includes receiving a search query from a client device via a network and in response to the received search query, determining if the received search query corresponds to one or more records of offline content. The records of offline content are previously determined and prior to receiving the search query. In response to determining that the received search query corresponds to at least one record of offline content, the method includes retrieving and providing the at least one record of offline content to the client device via the network.

US2016/0055259 provides a method and system for presenting content summary of search results. In one example, an input associated with a search query is received from a user. One or more search results are fetched based on the search query. A summary of content with respect to at least one of the one or more search results is obtained. A search result page is presented to the user as a response to the input. The search results page includes the one or more search results and at least part of the summary of content.

U.S. Pat. No. 7,707,142 provides a method and system that perform an offline search for an article. In one aspect of the invention, the aspect includes receiving a search query, determining whether the search query has been previously entered, if the search query has been previously entered, retrieving a previously stored result set, determining whether a previously stored result set meets at least one condition, and if the previously stored result set meets at least one condition, outputting the previously stored result set.

SUMMARY

It is an object of the present technology to ameliorate at least some of the inconveniences present in the prior art.

Developers' have developed embodiments of the present technology based on their appreciation of at least one problem associated with the prior art. For example, even though the prior art solution of "pre-loading" SERPs and associated queries to the client device has merits and assists with presenting offline SERPs, it still presents certain shortcomings. For example, due to the limited storage available in the client device to store the plurality of SERPs, it is difficult to achieve an acceptable coverage for all the possible search queries that may be received by the client device in the future, while offline or while in an area with low speed of network connectivity.

In developing the present technology, developers noted that elements forming a particular SERP (such as the titles, URLs, the snippet, the favicons, and the like) are not necessarily unique to any given particular SERP and may be "re-used" in a plurality of SERPs. Referring back to FIGS. 1 and 2, one could see that even for two completely different search queries ("Montreal Canadiens" and "habs"), some SERP elements are common (or "shared") to the first and second SERPs 106 and 206. For example, the favicon associated with the Wikipedia™ web resource is displayed for a total of three times within the SERP 106 and 206. In another example, the title and the URL for the first search result 108 of the SERP 106 is the same as the first search result 208 of the SERP 206.

As such, the present technology has been developed on the assumption that by eliminating duplicate SERP elements, a larger amount of SERPs could possibly be pre-loaded into the client device to achieve better coverage.

In accordance with one broad aspect of the present technology, there is provided a method of processing a search query, the method executable at an electronic device, the electronic device storing, in its permanent storage, an offline query result database, the offline query result database comprising: an offline query index storing one or more offline search queries, each of the one or more offline search queries being associated with a respective offline search engine result page (SERP) template pointer; an offline SERP template index storing one or more offline SERP templates, each of the one or more offline SERP templates comprising a list of one or more element pointers; at least one SERP elements index storing a plurality of SERP elements, each SERP element associated to at least one of the one or more element pointers, the plurality of SERP elements having been organized by a respective SERP element type; the method comprising: receiving a search query from a user associated with the electronic device; determining whether the search query is stored in the offline query index by comparing the search query against the one or more offline search queries stored therein; responsive to determining that the search query matches a given offline search query, determining the offline SERP template pointer associated with the given offline search query; determining, based on the offline SERP template pointer, an associated offline SERP template stored within the offline SERP template index; accessing the list associated with the associated offline SERP template; retrieving, for each one or more element pointers comprising the list, a respective SERP element, from the at least one SERP elements index; generating an offline SERP by compiling the retrieved SERP elements; and displaying the offline SERP on the electronic device.

In some implementations of the method, the one or more offline search queries are stored in an alphabetically sorted array and further clustered into one or more offline search queries clusters each comprising a subset of the stored offline search queries starting with the same first N characters.

In some implementations of the method, the offline query result database further comprises a partial offline query index storing one or more unique sets of characters generated based on the first N characters of the one or more offline search queries, each of the one or more unique sets of characters being associated with a respective query cluster pointer.

In some implementations of the method, prior to determining whether the search query is stored in the offline query index, the method further comprises: parsing a portion of the search query, the portion comprising the first N characters of the search query; determining whether the portion is stored within the partial offline query index by comparing the portion against the one or more set of characters; responsive to determining that the portion matches a given set of characters, determining the associated query cluster pointer; and accessing a given offline search query cluster based on the given query cluster pointer.

In some implementations of the method, determining whether the search query is stored in the offline query index comprises determining whether the search query is stored within the given offline search query cluster.

In some implementations of the method, each of the one of more offline search queries has a unique query position value within the offline query index; each of the one or more SERP templates corresponds to a respective offline search query; and each of the one or more SERP templates is stored within the offline SERP template index in an order determined based on the query position value of the respective offline search query.

In some implementations of the method, the associated offline SERP template comprises at least two element pointers each associated with respective SERP elements, one of the at least two element pointers having a lowest element pointer position value within the associated offline SERP template, and another one of the at least two element pointers having a highest element pointer position value within the associated offline SERP template.

In some implementations of the method, the offline SERP template pointer comprises an indication of the element pointer having the lowest position value within the associated SERP template.

In some implementations of the method, retrieving the respective SERP element comprises sequentially retrieving the respective SERP elements starting from the respective SERP element associated with the element pointer having the lowest position value and finishing after retrieving the respective SERP element associated with the associated with the element pointer having the highest position value.

In some implementations of the method, the at least one SERP elements index comprises a plurality of SERP elements indexes, each of the plurality of SERP elements indexes storing SERP elements of a specific one of the respective SERP element type.

In some implementations of the method, compiling the retrieved SERP elements comprises sequentially compiling the SERP element associated with the element pointer having the lowest position value until the SERP element associated with the element pointer having the highest position value.

In some implementations of the method, the plurality of SERP element indexes comprise: a uniform resource locator elements index; a title elements index; a snippet elements index; a favicon elements index; and an image elements index.

In some implementations of the method, the one or more offline SERP templates comprises a first offline SERP template and a second offline SERP template, the number of element pointers of the first offline SERP template being different from the number of element pointers of the second offline SERP template.

In some implementations of the method, the offline query result database has been generated and pre-loaded into the permanent storage by a search engine server via a communication network prior to execution of the method.

In some implementations of the method, the offline query result database has been generated based on SERPs previously generated by the search engine server based on third-party users' search queries.

In some implementations of the method, the at least one offline SERP template index stores a pre-defined number of offline SERP templates, the pre-defined number having been determined by an operator of the search engine server to satisfy a certain number of search queries from the user.

In some implementations of the method, each offline SERP template includes a pre-defined number of element pointers.

In some implementations of the method, determining whether the search query is stored within the search query index is in response to determining that: there is no connection between the electronic device and a search engine server to which the electronic device is coupled to via a communication network; or there is a slow connection between the electronic device and the search engine server.

Another broad aspect of the present technology, there is provided an electronic device configured to process a search query, the electronic device comprising: an offline query result database stored in a permanent storage, the offline query result database comprising: an offline query index storing one or more offline search queries, each of the one or more offline search queries being associated with a respective offline search engine result page (SERP) template pointer; an offline SERP template index storing one or more offline SERP templates, each of the one or more offline SERP templates comprising a list of one or more element pointers; at least one SERP elements index storing a plurality of SERP elements, each SERP element associated to at least one of the one or more element pointers, the plurality of SERP elements having been organized by a respective SERP element type; at least one computer processor configured to: receive a search query from a user associated with the electronic device; determine whether the search query is stored in the offline query index by comparing the search query against the one or more offline search queries stored therein; responsive to determining that the search query matches a given offline search query, determine the offline SERP template pointer associated with the given offline search query; determine, based on the offline SERP template pointer, an associated offline SERP template stored within the offline SERP template index; retrieve the list associated with the associated offline SERP template; retrieve, for each one or more element pointers comprising the list, a respective SERP element, from the at least one SERP elements index; generate an offline SERP by compiling the retrieved SERP elements; and display the offline SERP on the electronic device.

In some implementations of the method, the offline query result database has been generated and pre-loaded into the permanent storage by a server via a communication network prior to execution of the method.

In some implementations of the method, determining whether the search query is stored within the search query index is in response to determining that: there is no connection between the electronic device and a search engine server to which the electronic device is coupled to via a communication network; or there is a slow connection between the electronic device and the search engine server.

In the context of the present specification, a "server" is a computer program that is running on appropriate hardware and is capable of receiving requests (e.g. from electronic devices) over the network, and carrying out those requests, or causing those requests to be carried out. The hardware may be one physical computer or one physical computer system, but neither is required to be the case with respect to the present technology. In the present context, the use of the expression a "at least one server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, unless provided expressly otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

DESCRIPTION OF THE DRAWINGS

For a better understanding of the present technology, as well as other aspects and further features thereof, reference is made to the following description which is to be used in conjunction with the accompanying drawings, where:

FIG. 5 depicts a schematic illustration of a search query index of the offline query result database of FIG. 4.

FIG. 6 depicts a schematic illustration of a title elements index of the offline query result database of FIG. 4.

FIG. 7 depicts a schematic illustration of an offline SERP template index of the offline query result database of FIG. 4.

FIG. 8 depicts a schematic illustration of a partial offline query index of the offline query result database of FIG. 4.

FIG. 11 depicts an example of a process of determining a list of element pointers stored within the offline SERP template index of offline query result database stored within the electronic device of FIG. 9.

DETAILED DESCRIPTION

Figure 3:
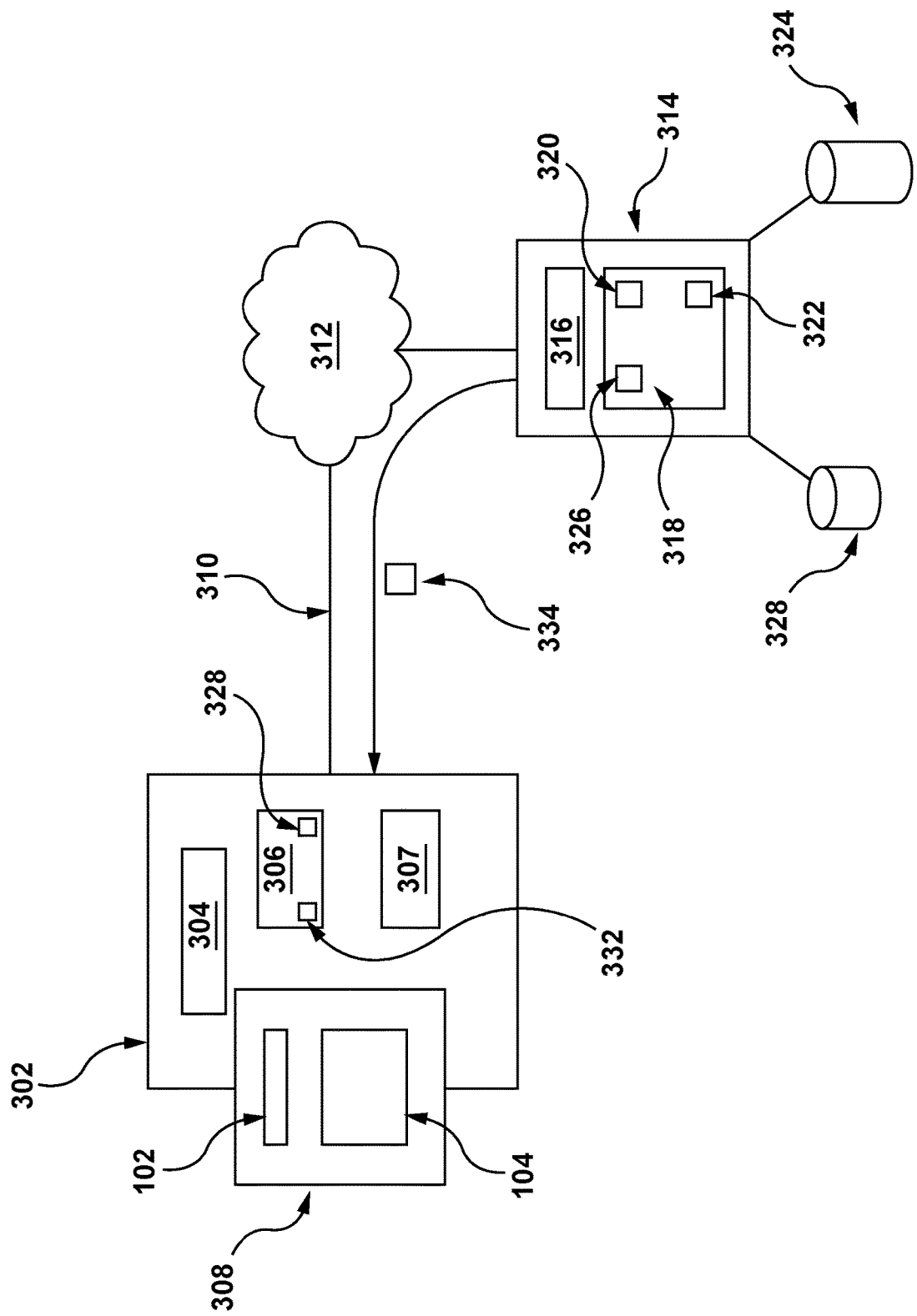
FIG. 3 depicts a system suitable for implementing embodiments of the present technology and/or being used in conjunction with implementations of the present technology.

Referring to FIG. 3, there is shown a schematic diagram of a system 300, the system 300 being suitable for implementing non-limiting embodiments of the present technology. It is to be expressly understood that the system 300 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 300 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 300 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 300 comprises an electronic device 302. The electronic device 302 is typically associated with a user (not depicted) and, as such, can sometimes be referred to as a "client device". It should be noted that the fact that the electronic device 302 is associated with the user does not mean to suggest or imply any mode of operation—such as a need to log in, a need to be registered or the like.

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

The electronic device 302 comprises a permanent storage 306. The permanent storage 306 may encompass one or more storage media and generally provides a place to store computer-executable instructions executable by a processor 304. By way of example, the permanent storage 306 may be implemented as a computer-readable storage medium including Read-Only Memory (ROM), hard disk drives (HDDs), solid-state drives (SSDs), and flash-memory cards.

The electronic device 302 further comprises a volatile memory 307. The volatile memory 307 may encompass one or more storage media and generally provides a place to temporarily store computer-executable instructions that are being executed by the processor 304 for the time that the computer-executable instructions are being executed by the processor 304. By way of example, the volatile memory 307 may be implemented as a computer-readable storage medium including Random Access Memory (RAM).

The electronic device 302 comprises hardware and/or software and/or firmware (or a combination thereof), as is known in the art to execute a search application 308. Generally speaking, the purpose of the search application 308 is to enable the user associated with the electronic device 302 to execute a web search. To that end, the search application 308 comprises the aforementioned query interface 102 and the search results interface 104.

How the search application 308 is implemented is not particularly limited. One example of the search application 308 may be embodied in the user accessing a web site associated with a search engine to access the search application 308. For example, the search application 308 can be accessed by typing in an URL associated with Yandex™ search engine at www.yandex.com.

In alternative non-limiting embodiments of the present technology, the search application 308 may be implemented as a search application on a portable device. For example (but not limited) to those implementations, where the electronic device 302 is implemented as a portable device, such as for example, Samsung™ Galaxy™ SIII, the electronic device 302 may be executing a Yandex™ search application. It should be expressly understood that any other commercially available or proprietary browser application can be used for implementing non-limiting embodiments of the present technology.

The electronic device 302 comprises a communication interface (not depicted) for two ways communication via a communication network 312 via a communication link 310. In some non-limiting embodiments of the present technology, the communication network 312 can be implemented as the Internet. In other embodiments of the present technology, the communication network 312 can be implemented differently, such as any wide-area communication network, local-area communications network, a private communications network and the like.

How the communication link 310 is implemented is not particularly limited and depends on how the electronic device 302 is implemented. Merely as an example and not as a limitation, in those embodiments of the present technology where the electronic device 302 is implemented as a wireless communication device (such as a smart phone), the communication link 310 can be implemented as a wireless communication link (such as, but not limited to, a 3G communications network link, a 4G communications network link, a Wireless Fidelity, or WiFi®, for short, Bluetooth®, or the like) or wired (such as an Ethernet based connection).

It should be expressly understood that implementations for the electronic device 302, the communication link 310 and the communication network 312 are provided for illustration purposes only. As such, those skilled in the art will easily appreciate other specific implementational details for the electronic device 302, the communication link 310, and the communication network 312. As such, by no means, examples provided hereinabove are meant to limit the scope of the present technology.

The system 300 further includes a search engine server 314 (or, simply, "server 314") coupled to the communication network 312. The server 314 can be implemented as a conventional computer server. In an example of an embodiment of the present technology, the server 314 can be implemented as a Dell™ PowerEdge™ Server running the Microsoft™ Windows Server™ operating system. Needless to say, the server 314 can be implemented in any other suitable hardware and/or software and/or firmware or a combination thereof. In the depicted non-limiting embodiment of the present technology, the server 314 is a single server. In alternative non-limiting embodiments of the present technology, the functionality of the server 314 may be distributed and may be implemented via multiple servers.

The implementation of the server 314 is well known. However, briefly speaking, the server 314 comprises a communication interface (not depicted) structured and configured to communicate with various entities (such as the electronic device 302, and other devices potentially coupled to the communication network 312) via the communication network 312. Similar to the electronic device 302, the server 314 comprises a server memory 318 which comprises one or more storage media and generally provides a place to store computer-executable program instructions executable by a server processor 316. By way of example, the server memory 318 may be implemented as tangible computer-readable storage medium including Read-Only Memory (ROM) and/or Random-Access Memory (RAM). The server memory 318 may also include one or more fixed storage devices in the form of, by way of example, hard disk drives (HDDs), solid-state drives (SSDs), and flash-memory cards.

In some embodiments of the present technology, the server 314 is under control and/or management of a search engine provider, such as Yandex LLC of Lev Tolstoy Street, No. 16, Moscow, 119021, Russia. However, the server 314 can be implemented differently (such as a local searcher and the like). The server 314 is configured to maintain an index 324, which contains an indication of crawled network resources (not depicted) accessible via the communication network 312.

The process of populating and maintaining the index 324 is generally known as "crawling", where a crawler application 322, contained within the server memory 318, is configured to "visit" one or more network resources (not depicted) via the communication network 312 and to index the content thereof (such as associating a given network resource to one or more keywords). In some embodiments of the present technology, the crawler application 322 maintains the index 324 as an "inverted index". Hence, the crawler application 322 is configured to store information about such indexed network resources in the index 324.

The server memory 318 contains computer-executable instructions for executing a ranking application 320 by the server processor 316. When the server 314 receives a search query from the search application 308 (such as, for example, "Are eyebrows considered facial hair?"), the server 314 is configured to execute the ranking application 320. The ranking application 320 is configured to access the index 324 to retrieve an indication of the plurality of network resources that are potentially relevant to the submitted search query. In this example, the ranking application 320 is further configured to rank the so-retrieved potentially relevant network resources so that they can be presented in a ranked order on the search results interface 104 as a SERP (such as the first SERP 106, the second SERP 206), such that the SERP presents the more relevant network resources at a top portion of the SERP (such as the first search result 108 and the second search result 110 of the first SERP 106).

The server memory 318 further contains a database builder application 326. The database builder application 326 comprises computer-executable program instructions executable by the server processor 316, the computer-executable program instructions being configured to generate and populate an offline query result database 328 (described below) maintained by the server 314.

Generating the Offline Query Result Database

Figure 4:
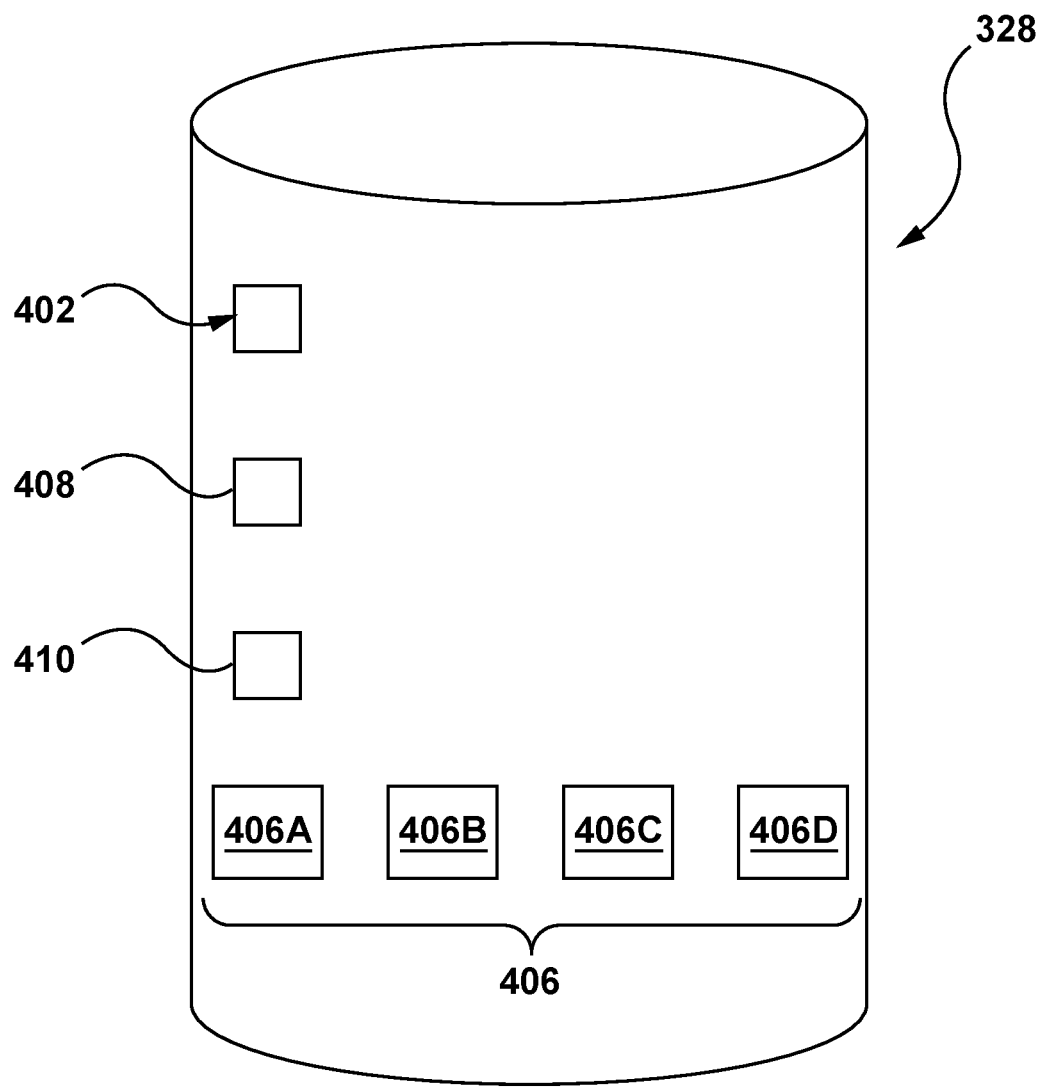
FIG. 4 depicts a schematic illustration of an offline query result database of a server of the system of FIG. 3.

With reference to FIG. 4, a non-limiting embodiment of the offline query result database 328 maintained by the server 314 is described.

As an illustration, the manner in which the database builder application 326 populates the offline query result database 328 will be explained using the first search query 502 ("Montreal Canadiens") and the second search query 504 ("habs") and the first SERP 106 and second SERP 206, respectively. It is to be expressly understood that this is done merely as an example, and it is not intended to be limitative. It should be noted that the database builder application 326 populates the offline query result database 328 using past queries. In other words, the database builder application 326 analyzes the first search query 502 and the second search query 504 that have been submitted by users prior to the database builder application 326 populating the offline query result database 328.

Starting with a general overview, the database builder application 326 is configured to perform a preliminary assessment of the first search query 502 and the second search query 504. More precisely, the database builder application 326 is configured to determine whether each of the first search query 502 and the second search query 504 meets at least one first condition determined by an operator (not depicted) of the server 314. In some embodiments of the present technology, determining whether each of the first search query 502 and the second search query 504 meets the at least one first condition comprises determining a frequency of each of the first search query 502 and the second search query 504 being processed by the server 314. For example, if it is determined that the second search query 504 is amongst, for example, the top 150 000 search queries processed by the server 314 from third party users, the first search query 502 may be deemed to meet the at least one first condition.

In some embodiments, the offline query result database 328 is a region specific offline query result database 328. For example, when assessing whether the second search query 504 meets the at least one first condition, the database builder application 326 is configured to determine whether the second search query 504 is amongst, for example, the top 150 000 search queries processed by the server 314 in a specific region, such as the province of Québec (or Northern Germany or the Island of Bali in Indonesia).

Now, assuming that both the first search query 502 and the second search query 504 meet the at least one first condition, the database builder application 326 is configured to store the first search query 502 and the second search query 504 in an offline query index 402.

With brief reference to FIG. 5, there is provided a non-limiting example of the offline query index 402 populated with one or more stored search queries 510, including both the first search query 502 and the second search query 504.

In one embodiment, the one or more stored search queries 510 are stored as an alphabetically sorted array with no duplicate entries within the offline query index 402. As such, each of the one or more stored search queries 510 has a unique query position value 516 within the offline query index 402. For example, the first search query 502 has a first query position value 512 indicating that the first search query 502 is stored as the $66^{th}$ entry within the offline query index 402. Similarly, the second search query 504 has a second query position value 514 indicating that the second search query 504 is stored as the $33^{rd}$ entry within the offline query index 402. It is contemplated that the one or more stored search queries 510 could be stored in the offline query index 402 in any other manner.

The one or more stored search queries 510 are further clustered into one or more offline search query clusters 506. For example, the one or more stored search queries 510 are clustered into, amongst other, a first offline search query cluster 506A, a second offline search query cluster 506B, a third offline search query cluster 506C, and a fourth offline search query cluster 506D.

Recalling that the one or more stored search queries 510 are stored alphabetically, the one or more stored search queries 510 are clustered based on the first two bytes of the one or more stored search queries 510. In other words, each of the one or more offline search query clusters 506 comprises a subset of the one or more stored search queries 510 beginning with the same number of letters that take two bytes to encode, such as either the first two letters (as is the case with English language words) or the first one letter (as is the case with Russian language words). For example, the second offline search query cluster 506B comprises all the stored search queries starting with the letters "ha" (thus, including the second search query 504). It is contemplated that the one or more offline search query clusters 506 could be generated based on more or less than the first two bytes of the one or more stored search queries 510. In some embodiments of the present technology, each of the so-created clusters can be individually compressed into a compressed stored cluster.

The additional benefit of some of these embodiments, where the one or more stored search queries 510 are clustered (with or without individual compression), can include the ability to individually access the required offline search query cluster during the in—use phase (as will be described herein below), which allows for more efficient retrieval of information during the in-use phase.

In some embodiments, prior to storing the first search query 502 and the second search query 504, the database builder application 326 is configured to optionally normalize each of the first search query 502 and the second search query 504, by removing articles (such as, "the", "a", etc.), removing spaces, converting capital letters to lowercase letters, and the like.

In some embodiments, as part of storing the first search query 502 and the second search query 504, the database builder application 326 is further configured to store an indication of a general interest weight (not depicted) associated with the first search query 502 and the second search query 504. In the context of the present technology, the term "general interest weight" refers to a parameter indicative of the general popularity of the given search query being stored (amongst other queries that are stored by the database builder application 326), which may be determined by the number of times the given search query is submitted by third parties to the server 314.

Referring back to FIG. 4, as part of the process of storing the first and second search queries 502, 504 in the offline query index 402, the database builder application 326 is also configured to populate one or more SERP element indexes 406. In the context of the present technology, the term "SERP element" refers to the elements that make up a given search result on the SERP. For example, for a given search result of the SERP, the SERP element can include: the result URL, the result title, the result snippet, the result favicon, one or more images associated with the result, object cards, widgets, and the like.

The manner in which the database builder application 326 parses and stores the different SERP elements from the first and second SERPs 106 and 206 is not limited, and may for example be done by analyzing the metadata of the first and second SERPs 106 and 206. In some embodiments of the present technology, the database builder application 326 is configured to parse the different SERP elements in a specific order, such as parsing the elements of the first search result 208 first, and then moving to the second search result 210. In some embodiments, the database builder application 326 is configured to parse the SERP elements of only a subset of the search results contained within the SERP, such as the top two search results (or any other number of Nth top results).

In some embodiments of the present technology, the database builder application 326 is further configured to, via the operator of the server 314, apply one or more criteria in parsing the different SERP elements. For example, one criterion would cause the database builder application 326 to only parse (and thereby store in the one or more SERP element indexes 406) a predetermined number of images that are contained within the SERPs associated with the one or more stored search queries 510. These predetermined numbers of images may be, for example, photos of the 1000 top searched celebrities. In another example, another criterion would cause the database builder application 326 to limit the text contained within a snippet, an object card, and the like, such as selecting the first 150 words, a summary, a contact information (such as a telephone number), or address related to the one or more stored search queries 510.

Within the current example, there is provided a title elements index 406A, an URL elements index 406B, a snippet elements index 406C, a favicon elements index 406D, and an image elements index (not depicted). It is contemplated that the offline query result database 328 may comprise more or less than these five element indexes. Furthermore, although depicted as separate indexes, the title elements index 406A, the URL elements index 406B, the snippet elements index 406C, the favicon elements index 406D and the image elements index (not depicted) may be implemented as a single index. For example, the single index may comprise a first subarray storing the SERP elements stored within the title elements index 406A, a second subarray storing the SERP elements stored within the URL elements index 406B, a third subarray storing the SERP elements stored within the snippet elements index 406C, a fourth subarray storing the SERP elements stored within the favicon elements index 406D, and a fifth subarray storing the SERP elements stored within the image elements index (not depicted).

With a reference to FIG. 6, there is provided a non-limiting example of the title elements index 406A populated with a plurality of stored title elements 604, which includes the titles of the top 2 search results of the SERPs 106 and 206 (i.e. the first search results 108, 208 and the second search results 110, and 210).

Figure 1:
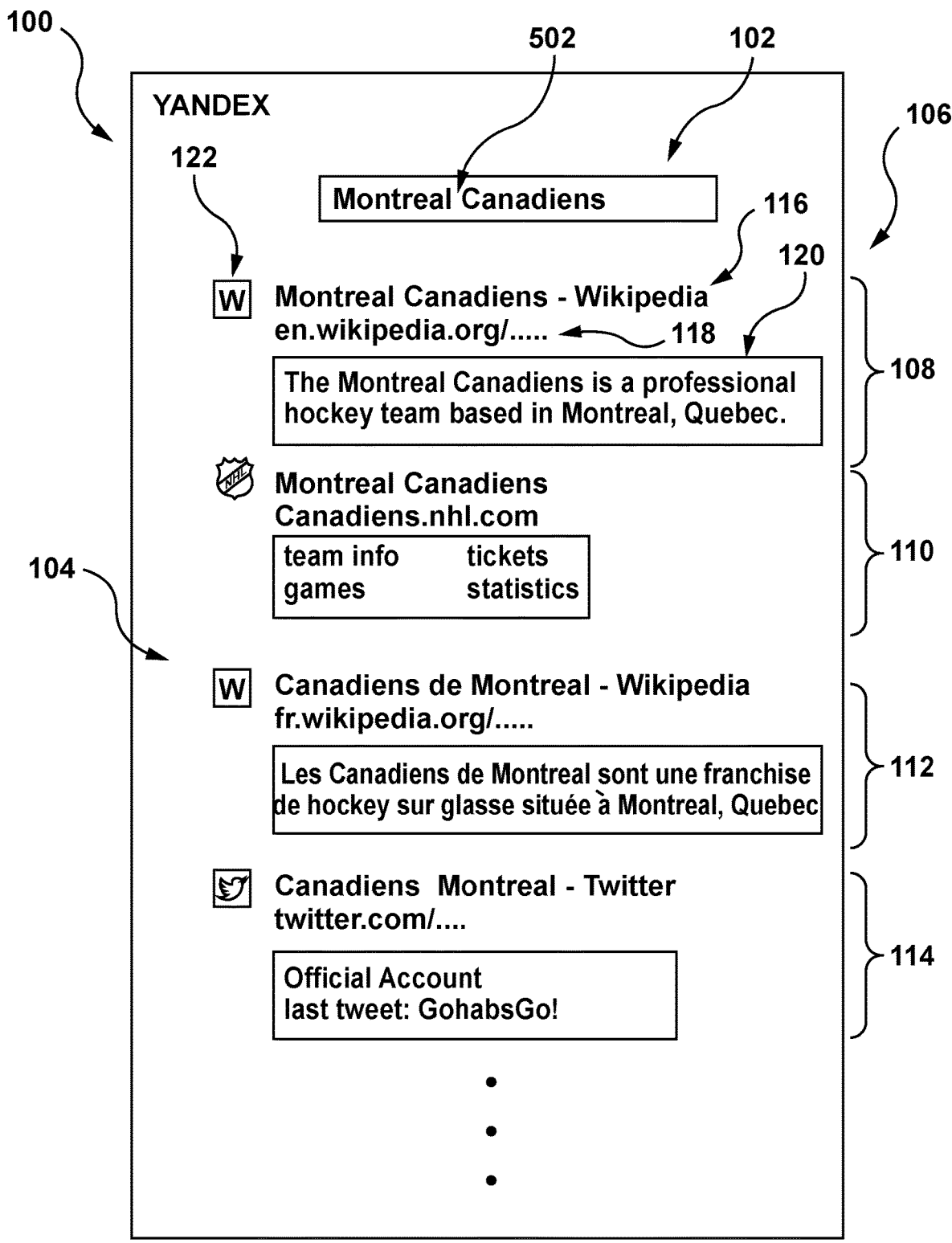
FIG. 1 depicts a screen shot, the screen shot depicting a SERP implemented in accordance with known techniques.
Figure 2:
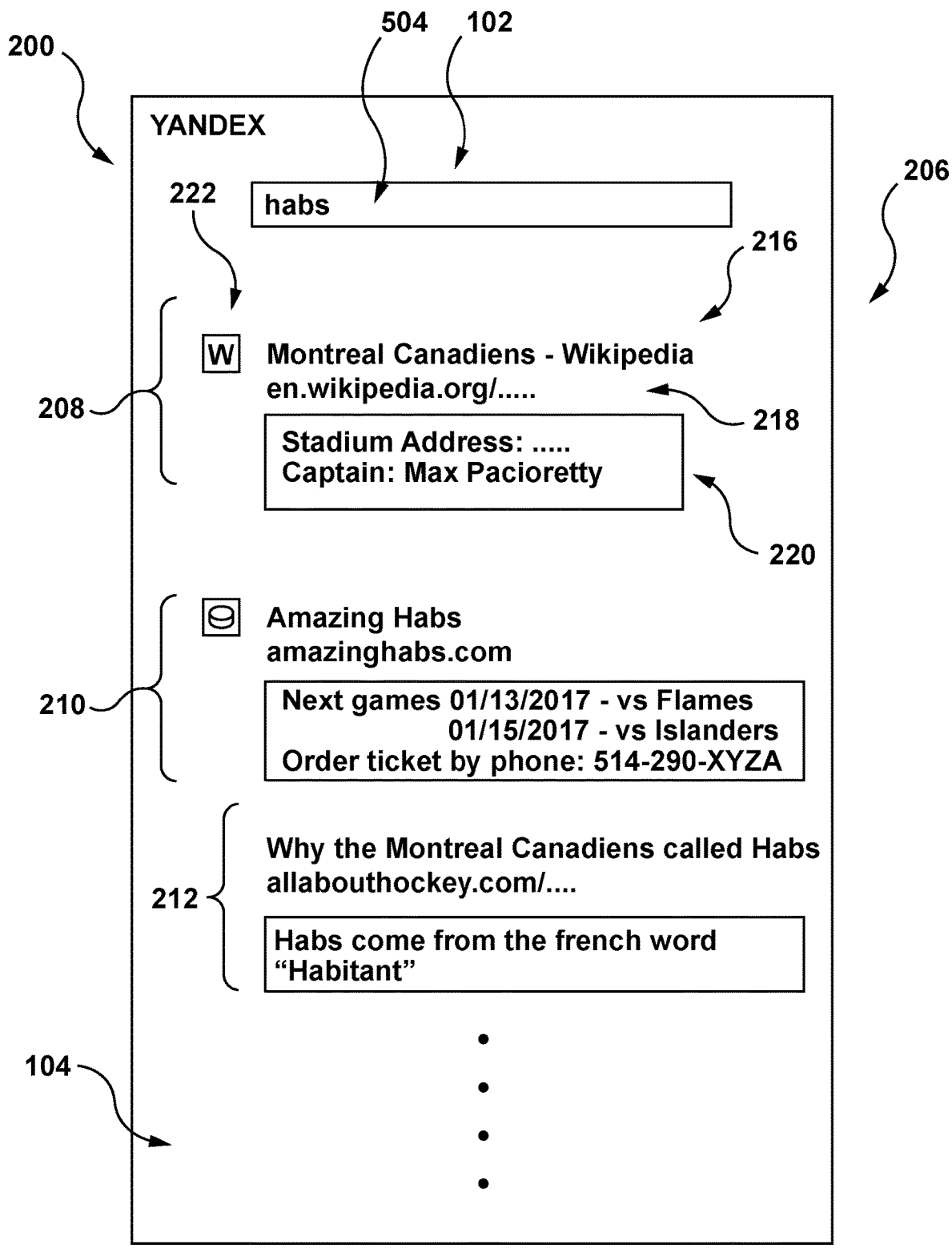
FIG. 2 depicts another screen shot, the screen shot depicting a SERP implemented in accordance with known techniques.

Similar to the one or more stored search queries 510, the plurality of stored title elements 604 are also stored in an alphabetically sorted array with no duplicate entries in the title elements index 406A. Needless to say, other SERP elements may be stored in a different manner. For example, it is contemplated that the favicon elements are stored based on the associated web resource's name. As such, each of the plurality of stored title elements 604 has a unique element position value 614 within the title elements index 406A. For example, the titles 116, 216 have a first element position 612 indicating that the titles 116, 216 is stored as a single entry in the $77^{th}$ entry of the title elements index 406A (as they have the same spelling). Similarly, the title 608 (which corresponds to the title of the second search result 110, see FIG. 1), has a second element position 610 indicating that the title 608 is stored as the $76^{th}$ entry within the title elements index 406A. It is contemplated that the plurality of stored title elements 604 may be stored in the title elements index 406A in any other manner.

It should be noted that the title elements index 406A is just one example of elements indexes that can be generated as part of implementing non-limiting embodiments of the present technology. It should be understood that, in order to generate the offline SERP during in-use (as described in more detail below), the parsed SERP elements are each stored in an element index associated with the type of the SERP elements. In other words, in accordance with embodiments of the present technology, the SERP element storages (i.e. the aforementioned title elements index 406A, the URL elements index 406B, the snippet elements index 406C, the favicon elements index 406D and the image elements index (not depicted), as well as other element storages potentially used) are each configured to store SERP elements of a—predetermined type. In some embodiments of the present technology, the pre-determined type is unique amongst the SERP element storages (i.e. the aforementioned title elements index 406A, the URL elements index 406B, the snippet elements index 406C, the favicon elements index 406D and the image elements index (not depicted), as well as other element storages potentially used).

For example, the URL elements are parsed and stored within the URL elements index 406B, the snippet elements are parsed and stored within the snippet elements index 406C, the favicon elements are parsed and stored within the favicon elements index 406D, and so on.

Attention is now turned back to FIG. 4. As part of storing the one or more stored search queries 510 and the SERP elements contained in their respective search results, the database builder application 326 is further configured to link the SERP elements to the associated stored search query (of the one or more stored search queries 510) by populating and maintaining an offline SERP template index 408.

With brief reference to FIG. 7, there is provided a non-limiting example of the offline template index 408 that has been populated with a plurality of element pointers 702 which are each directed to a specific SERP element stored within the SERP element indexes 406. Within the context of the present technology, the term "pointer" refers to a digital address to a specific entry within the offline query result database 328. Within the context of the present technology, the term "SERP template" refers to a structured list of element pointers 702 that are associated with a particular SERP.

The offline SERP template index 408 includes a first list 712, which comprises a subset of the plurality of element pointers 702 associated with the SERP elements parsed from the first and second search results 208, 210 of the second SERP 206. The offline SERP template index 408 further includes a second list 714, which comprises another subset of the plurality of element pointers 702 associated with the SERP elements parsed from the first and second search results 108, 110 of the SERP 106.

The first list 712 comprises a first sublist 708 and a second sublist 710. The first sublist 708 comprises a subset of the plurality of element pointers 702 associated with the first search result 208. The second sublist 710 comprises another subset of the plurality of element pointers 702 associated with the second search result 210. Taking a look at the first sublist 708, the first sublist 708 comprises a first element pointer 708A associated with the title 216, a second element pointer 708B associated with the URL 218, a third element pointer 708C associated with the snippet 220, and a fourth element pointer 708D associated with the favicon 222.

Each of the plurality of element pointers 702 has a unique element pointer position value 716 within the offline SERP template index 408. For example, the first element pointer 708A has a first element pointer position value 716A indicating that the first element pointer 708A is stored as the $264^{th}$ entry within the offline SERP template index 408.

In some embodiments of the present technology, the first element pointer position value 716A is determined based on the query position value 516 (see FIG. 5) of the associated stored search query. More precisely, in a situation where the database builder application 326 is configured to parse and store four SERP elements for each of the top two search results of each of the one or more stored search queries 510 (meaning that there would consistently be eight SERP elements stored for each of the one or more stored search queries), the first element pointer position value 716A would correspond to an eightfold value of the query position value 516 of the associated stored search query. For example, recalling that the second search query 504 (which is associated to the first list 714) is stored as the $33^{rd}$ entry of the offline query index 402, the first element pointer 708A is therefore stored at the $264^{th}$ entry within the SERP template index 408.

Each of the plurality of element pointers 702 is an absolute reference to a given SERP element stored within the SERP element indexes 406. As such, each of the plurality of element pointers 702 comprises two pointer references: (i) a first pointer reference indicative of a given SERP elements index from the SERP element indexes 406, such as an indication of the above described title elements index 406A; and (ii) a second pointer reference indicative of the element position value 614 associated with the given SERP element.

For example, recalling that the first element pointer 708A (title_77) is an element pointer associated with the title 216, the first pointer reference corresponds to the title elements index 406A. The second pointer reference corresponds to the first SERP element position value 612 associated with the title 216 (which is "77").

As briefly stated above, in some embodiments of the present technology, the number of SERP elements that are parsed and stored (within the SERP element indexes 406) for each one or more stored search queries 510 is pre-determined. For example, in the illustration of FIG. 7, each list (such as the first list 712 and the second list 714) stored in the offline SERP template index 408 comprises eight element pointers. In other words, when generating the offline SERP during the in-use phase (as described in further detail below), the length of a specific list stored in the offline SERP template index 408 is determined based on the unique element pointer position value 716 of the first element pointer of the specific list. Taking the first list 712 as an example, the length of the first list 712 is defined as including the eight element pointers starting from the first element pointer 708A (inclusively).

It should be understood that, unlike the depicted embodiment, depending on the specific criteria implemented by the operator (not depicted) of the server 314, the number of SERP elements parsed by the database builder application 326 may not be the same for each one or more stored search queries 510. The manner in which the length of the specific list is determined when building the offline SERP during in-use will be described in detail below.

Attention is now turned back to FIG. 5. In order to associate a given list to one of the one or more stored search queries 510, each of the one or more stored search queries 510 is associated with a respective offline SERP template pointer 508. For example, the first search query 502 is associated with a first offline SERP template pointer 508A, and the second search query 504 is associated with a second offline SERP template pointer 508B. As illustrated, each of the offline SERP template pointers 508 is directed to a particular element pointer position value 716 of the offline SERP template index 408 (see FIG. 7). For example, the second offline SERP template pointer 508B is a reference to the first element pointer position value 716A (which is "264"), and the first offline SERP template pointer 508A is a reference to a second element pointer position value 716B (which is "528").

In some embodiments, prior to storing a new search query within the offline query index 402, the database builder application 326 is configured to determine if the new search query has been previously stored within the offline query index 402. If the new search query has been previously stored within the offline query index 402, the database builder application 326 does not store the new search query within the offline query index 402. This allows the offline query index 402 to be populated with no duplicate search query.

As stated previously, once a new search query meets the at least one first condition, the new search query is stored within the offline query result database 328. In other words, even if the new search query is not properly spelled, the database builder application 326 is configured to store the new search query within the offline query index 402. However, the database builder application 326 is also configured to determine whether the actual correctly spelled search query is one of the one or more stored search queries 510. If it is determined that the new search query is the misspelled form of one of the one or more stored search queries 510, the database builder application 326 is configured to store the misspelled new search query in the offline query index 402 (as it meets the at least on first condition), but does not parse and store the SERP elements associated with the misspelled new search query.

For example, let us assume that the misspelled new search query is "hays" instead of "habs" (which is the second search query 504 stored within the offline query index 402). Upon determination that a corrected form of the misspelled new search query corresponds to the previously stored second search query 504 (and that the misspelled new search query meets the at least one first condition), the database builder application 326 is configured to store the misspelled new search query within the offline query index 402, and configures the offline SERP template pointer associated with the misspelled new search query to be a reference (i) to the first offline SERP element pointer 708A (which is associated with the second search query 504 ("habs")) within the offline SERP template index 408 (see FIG. 7), or (ii) to the second search query 504 ("habs") within the offline query index 402. The following Table 1 illustrates an example of the offline query index 402 with the misspelled new search query stored therein:

TABLE 1

| Offline Query Index 402 | | | | |
|---|---|---|---|---|
| One or more Stored search query 510 | [ . . . ] | "habs" | [ . . . ] | "havs" |
| Query position value 516 | 32 | 33 | 34 | 35 |
| offline SERP template pointer 508 | [ . . . ] | 264 | [ . . . ] | 264 OR Go to "Query Position value #33" |

In a further embodiment, as part of storing a new search query within the offline query index 402, the database builder application 326 is configured to determine whether the new search query has a synonym search query that has been previously stored in the offline query index 402. In the context of the present technology, the term "synonym search query" refers to a previously stored search query that has a contextual SERP similarity parameter above a predetermined threshold in relation to the new search query. In other words, the database builder application 326 is configured to analyze the contextual similarity between the SERP elements forming the first top Nth search results of both the new search query and the stored search query. If it is determined that a synonym search query has been previously stored within the offline query index 402, the database builder application 326 is configured to store the new search query, but does not parse and store the SERP elements associated with the new search query.

For example, let us assume that the new search query is the first search query 502 (not stored yet), and the database builder application 326 has determined that the second search query 504 (already stored) is a synonym search query to the first search query 502. In such a situation, the database builder application 326 may store the new search query within the offline query index 402, but instead of parsing and storing the SERP elements associated with the new search query (as done in FIGS. 6 and 7), the database builder application 326 configures the first offline SERP template pointer 508A to be a reference (i) to the first offline SERP element pointer 708A (which is associated with the second search query 504) within the offline SERP template index 408 (see FIG. 7), or (ii) to the second search query 504 within the offline query index 402. The following Table 2 illustrates an example of the offline query index 402 with the new search query ("Montreal Canadiens"), and the synonym search query ("habs") are stored therein.

TABLE 1

| Offline Query Index 402 | | | | |
|---|---|---|---|---|
| One or more Stored search query 510 | [ . . . ] | "habs" | [ . . . ] | "Montreal Canadiens" |
| Query position value 516 | 32 | 33 | [ . . . ] | 66 |
| offline SERP template pointer 508 | [ . . . ] | 264 | [ . . . ] | 264 OR Go to "Query Position value #33" |

Needless to say, it is contemplated that the misspelled new search query, once stored, could be directed to an associated corrected search query, which in turn is directed to an associated synonym search query.

A special technical effect of these embodiments of the present technology includes the ability to, in a sense, "de-duplicate" offline SERPs, which results in reduced memory requirements for storing the offline SERP template index 408 within the electronic device 302 (described below), while maintaining broad coverage of potential search queries to be received by the user of the electronic device 302. In other words, the misspelling and synonym de-duplication processes allow sorting a single SERP template that is used for a number of misspelled and search queries having a synonymous search query previously stored.

Referring back to FIG. 4, in some embodiments of the present technology, the database builder application 326 is further configured to maintain and populate a partial offline query index 410.

With brief reference to FIG. 8, there is provided a non-limiting example of the partial offline query index 410, populated with one or more unique sets of characters 802 and a respective query cluster pointer 804.

In some embodiments, the one or more unique sets of characters 802 are generated based on the first two bytes of the one or more stored search queries 510. For example, there is provided a first set of characters 802A representative of "ha". A first search query cluster pointer 804A associated to the first set of characters 802A provides the indication of the second offline search query cluster 506B. It is contemplated that the one or more unique sets of characters 802 could be generated based on more or less than the first two characters of the one or more stored search queries 510.

It is contemplated that the server 314 is configured to update the offline query result database 328 on a periodic basis, such as once a week, to include (or remove) new search queries and their associated SERPs.

Storing the Offline Query Result Database on the Client Device

Referring back to FIG. 3, in some embodiments of the present technology, the electronic device 302 is configured to receive, via the communication interface (not depicted) a data packet 334, from the server 314. The data packet 334 comprises the offline query result database 328 and an offline SERP building application 332. Both the offline query result database 328 and the offline SERP building application 332 are stored within the permanent storage 306 and accessible by the search application 308.

The manner in which the data packet 334 is transmitted is not limitative. However, due to the amount of data stored within the offline query result database 328, it is contemplated that the data packet 334 is transmitted upon the determination that the electronic device 302 is coupled to the communication network 312 via a particular communication link 310, such as WiFi™.

It is further contemplated that the offline query result database 328 could be updated, on a period basis, such as once a week.

Processing a Search Query on the User's Device

Referring to FIGS. 9 to 13, the manner of generating an offline SERP by the offline SERP building application 332 is described. In the context of the present technology, the term "offline SERP" refers to a SERP generated within the electronic device 302 without receiving any data from the server 314.

Starting with a general overview, when launched, the search application 308 is configured to perform a preliminary assessment of the connectivity between the electronic device 302 and the server 314. Upon determination that there is no, or slow connection between the electronic device 302 and the server 314, the offline SERP building application 332 is triggered.

Figure 9:
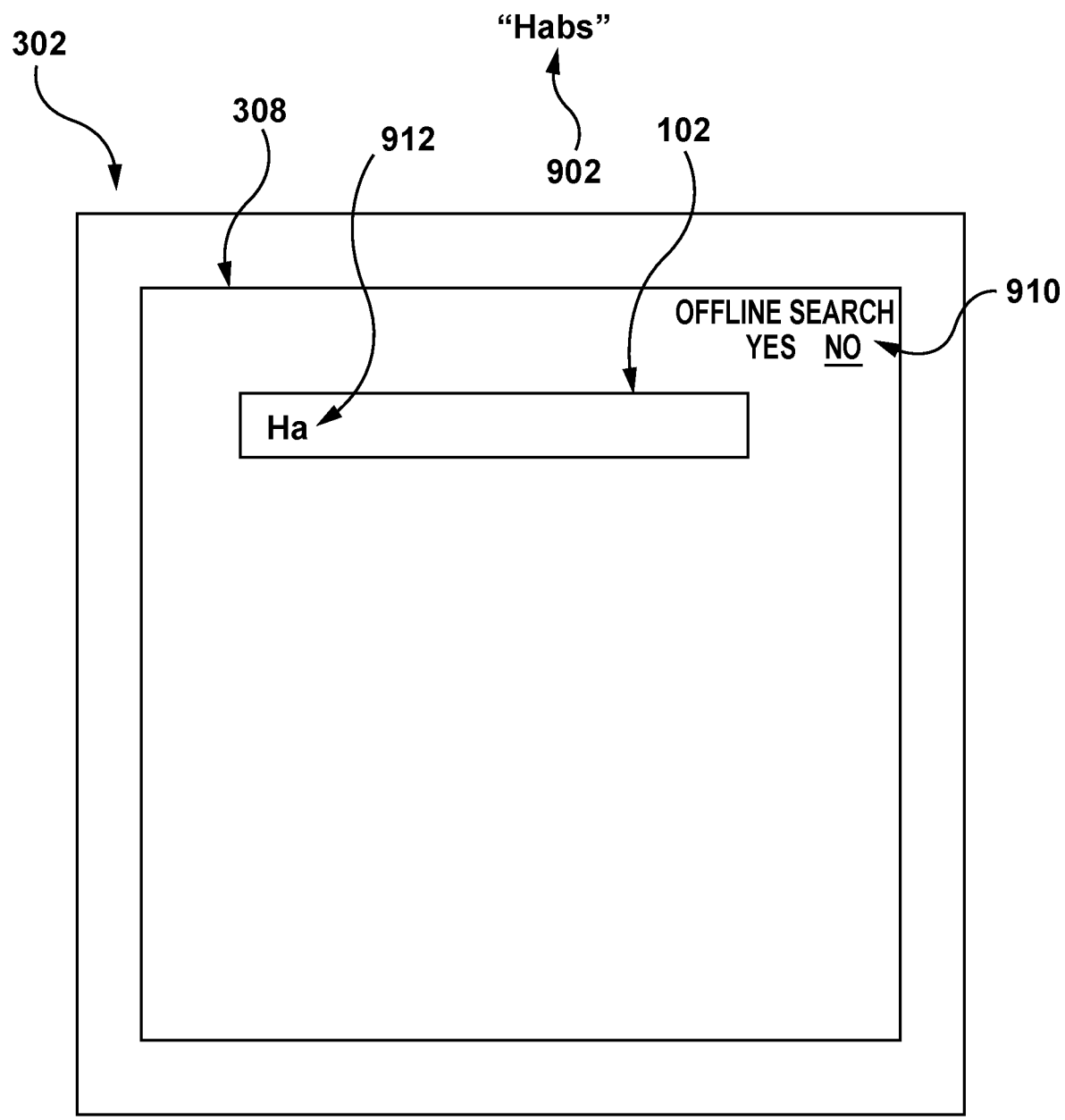
FIG. 9 depicts a schematic illustration of an electronic device of the system of FIG. 3.

With reference to FIG. 9, the manner in which the preliminary assessment of the connectivity is made is now explained. Let us assume that the user associated with the electronic device 302 is desirous of running a new search query 902 ("habs"), which he has never done previously.

Generally speaking, the search application 308 is configured to, as the user enters the letters of the new search query 902, provide query suggestions in a dropdown box (not depicted). The manner in which query suggestions are provided to a user entering a search query is known in the art and will not be described at length. However, suffice it to say that the query suggestions are generally provided by transmitting, from the electronic device 302, an indication of the partially entered query, to the server 314, and receiving in response, one or more query suggestions determined by the server 314.

Now, in the illustration, the user has entered a partially entered query 912, but no search query suggestions have been received by the electronic device 302, which can be indicative of a slow, or no connection between the electronic device 302 and the server 314. As a result, the offline SERP building application 332 is triggered.

It is contemplated that the preliminary assessment of the connectivity could be done in a different manner. For example, as the user associated with the electronic device 302 launches the search (by pressing the "enter key", for example), the electronic device 302 is configured to determine if at least one second condition is met. The at least one second condition is met when (i) the bandwidth between the electronic device 302 and the server 314 is below a first threshold, and/or the latency between the electronic device 302 and the server 314 is above a second threshold. Upon determination that the at least one second condition is met, the offline SERP building application 332 is triggered.

It is also contemplated that the search application 308 could provide an actuator 910, which when actuated by the user, is configured to trigger the offline SERP building application 332, thereby generating an offline SERP in response to the new search query 902. This is particularly useful in a situation where the user is desirous in not exceeding a cellphone data plan limit.

In some embodiments of the present technology, it is also contemplated that the offline SERP building application 332 is triggered as a result of the search application 308 being launched by the user. As such, the offline SERP building application 332 is configured to display, within the dropdown box (not depicted), one or more offline search suggestions. More precisely, in response to the partially entered query 912 being entered within the query interface 102, the offline SERP building application 332 is configured to access one of the offline search query clusters 506 that corresponds to the first two bytes of the partially entered query 912 and select a pre-determined number of stored search queries starting with the same first two bytes based on their associated general interest weight. In a specific non-limiting embodiment of the present technology, the offline SERP building application 332 is configured to access one of the offline search query clusters 506 that corresponds to the first two bytes of the partially entered query 912 and select three stored search queries starting with the same first two bytes having the highest general interest weight amongst stored search queries of that cluster.

Now, let us assume that for any of the above reasons, the offline SERP building application 332 is triggered. The offline SERP building application 332 comprises computer-executable program instructions executable by the processor 304 to generate the offline SERP.

In some embodiments, as a result of the trigger, the offline SERP building application 332 is configured to load the offline query result database 328 into the volatile memory 307. Although the volatile memory 307 is considered to be one of the fastest storage locations available to the processor 304, due to the amount of data contained within the offline query result database 328, it is possible that loading the offline query result database 328 into the volatile memory 307 would cause the electronic device 302 to "crash". As such, it is contemplated that the offline query result database 328 may be partially uploaded on the volatile memory 307 (or other storage within the electronic device 302) and accessed by other means, such as using memory mapping, by the processor 304.

Figure 10:
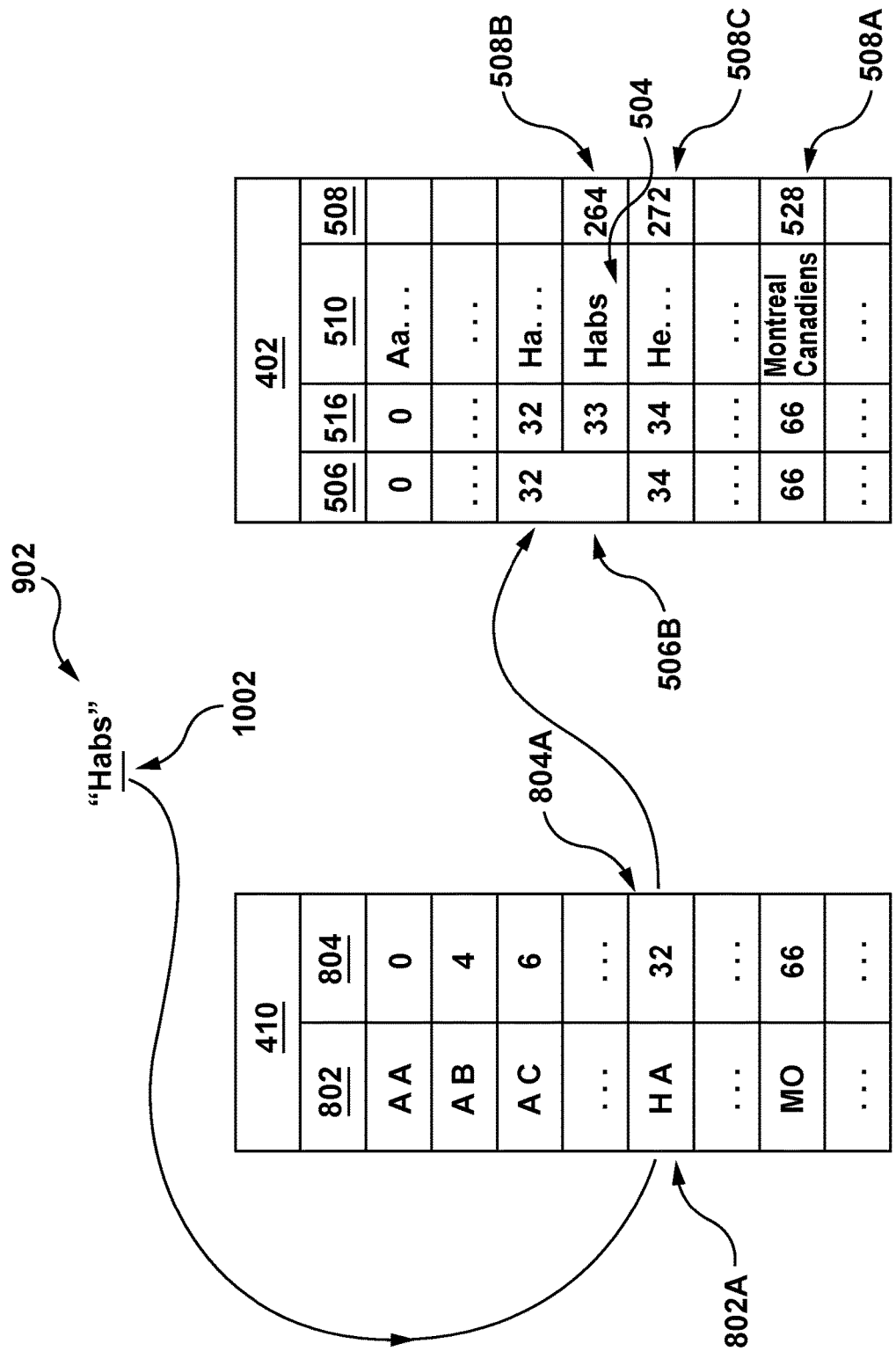
FIG. 10 depicts an example of a process of determining whether a new search query corresponds to an entry within the partial offline query index and search query index of offline query result database stored within the electronic device of FIG. 9.

Reference is now made to FIG. 10, which illustrates a non-limiting embodiment of determining whether the new search query 902 corresponds to one of the one or more stored search queries 510.

Firstly, the offline SERP building application 332 is configured to parse the first 2 bytes encoding the new search query 902 (which corresponds to the first two letters with English language words and first letter as is the case with Russian language words) into a partial search query 1002. The partial search query 1002 is compared to the one or more unique sets of characters 802 to determine if the partial search query 1002 is stored within the partial offline query index 410. The manner in which the comparison is made is not limitative, and may be done using any known methods, such as the use of a top-down character comparison, a binary search comparison, and the like.

It is contemplated that prior to parsing, the offline SERP building application 332 is configured to normalize the new search query 902, such as removing spaces or articles (such as "the", "a", etc.).

As illustrated, it is determined that the partial search query 1002 corresponds to the first set of characters 802A. As such, the offline SERP building application 332 is configured to retrieve the first search query cluster pointer 804A associated with the first set of characters 802A. Recalling that the first search query cluster pointer 804A provides the indication of the second offline search query cluster 506B, the offline SERP building application 332 consequently accesses the search query cluster 506B of the offline query index 402.

Once the offline SERP building application 332 has accessed the search query cluster 506B, the new search query 902 is then compared to the one or more stored search queries stored within the second offline search query cluster 506B. The manner in which the comparison is made is not limitative, and may be done using known methods, such as a character-by-character comparison, a binary search comparison, etc.

In some embodiments of the present technology, the offline SERP building application 332 is configured to access the offline query index 402 to determine whether the new search query 902 corresponds to one of the one or more stored search queries 510, without accessing firstly the partial offline query index 410.

Within the illustration, it is determined that the new search query 902 corresponds to one of the one or more stored search queries 510, namely the second search query 504.

Now, before advancing any further, as described above, depending on the implementation of the present technology, the offline SERP template index 408 (see FIG. 7) could (i) store a different number of element pointers for each of the one or more stored search queries 510, or (ii) store a consistent number of element pointers for each one or more stored search queries 510 (such as eight element pointers for each list stored therein). An explanation will follow as to how the length of the first list 712 within the offline SERP template index 408 is determined by the electronic device 302 depending on the two situations described.

In the first situation, prior to accessing the offline SERP template index 408, the offline SERP building application is configured to retrieve two pointers from the offline query index 402: (i) the second offline SERP template pointer 508B associated with the second search query 504; and (ii) a third offline SERP template pointer 508C, which is the offline SERP template pointer associated with a third search query (not depicted) that is the next entry to the second search query 504.

Reference is now briefly made to FIG. 11. Recalling that the second offline SERP template pointer 508B is a reference to the first element pointer 708A, the offline SERP building application 332 accesses the first element pointer 708A of the offline SERP template index 408. More precisely, the offline SERP building application 332 is configured to access the first element pointer 708A and tag it as a "start" of the first list 712. The offline SERP building application 332 is further configured to access the element pointer (not depicted) associated with the third offline SERP template pointer 508C and tag it as a "start" of a subsequent list (not numbered).

Thus, by using the second offline SERP template pointer 508B and the third offline SERP template pointer 508C, the offline SERP building application 332 is configured to determine the length of the first list 712. As such the offline SERP building application 332 is configured to retrieve, in order, each of the SERP elements contained within the first list 712.

Returning to the second situation, prior to accessing the offline SERP template index 408, the offline building application is configured to retrieve, from the offline query index 402, only the second offline SERP template pointer 508B associated with the second search query 504. After accessing the first element pointer 708A, the offline SERP building application 332 is configured to determine that the eight element pointer following the first element pointer 708A (inclusively) is the length of the first list 712. As such, the offline SERP building application 332 is configured to retrieve, in order, each of the SERP elements contained within the first list 712.

Assuming for an instant, that instead of correctly spelling the new search query 902, the new search query 902 contained a spelling error (such as "hays" instead of "habs"). As explained above, if the misspelled search query was previously stored by the database builder application 326 within the offline query index 402, the offline SERP template pointer associated with the stored misspelled search query could be either (i) a copy of the second offline SERP template pointer 508B (thus allowing the offline SERP building application 332 to access the first element pointer 708A), or (ii) a reference to the second search query 504 ("habs") within the offline query index 402.

Now, upon determination that the new search query 902 is correctly spelled or retrieving the pointer associated with the corresponding correctly spelled search query, depending on the implementation of the current technology, it may be that the database builder application 326 has stored the first search query 502 as the synonym search query to the second search query 504 (to which the new search query 902 matches). As explained above, in such situation, the second offline SERP template pointer 508B could be either (i) a copy the first offline SERP template pointer 508A (thus allowing the offline SERP building application 332), or (ii) a reference to the first search query 502 within the offline query index 402.

Figure 12:
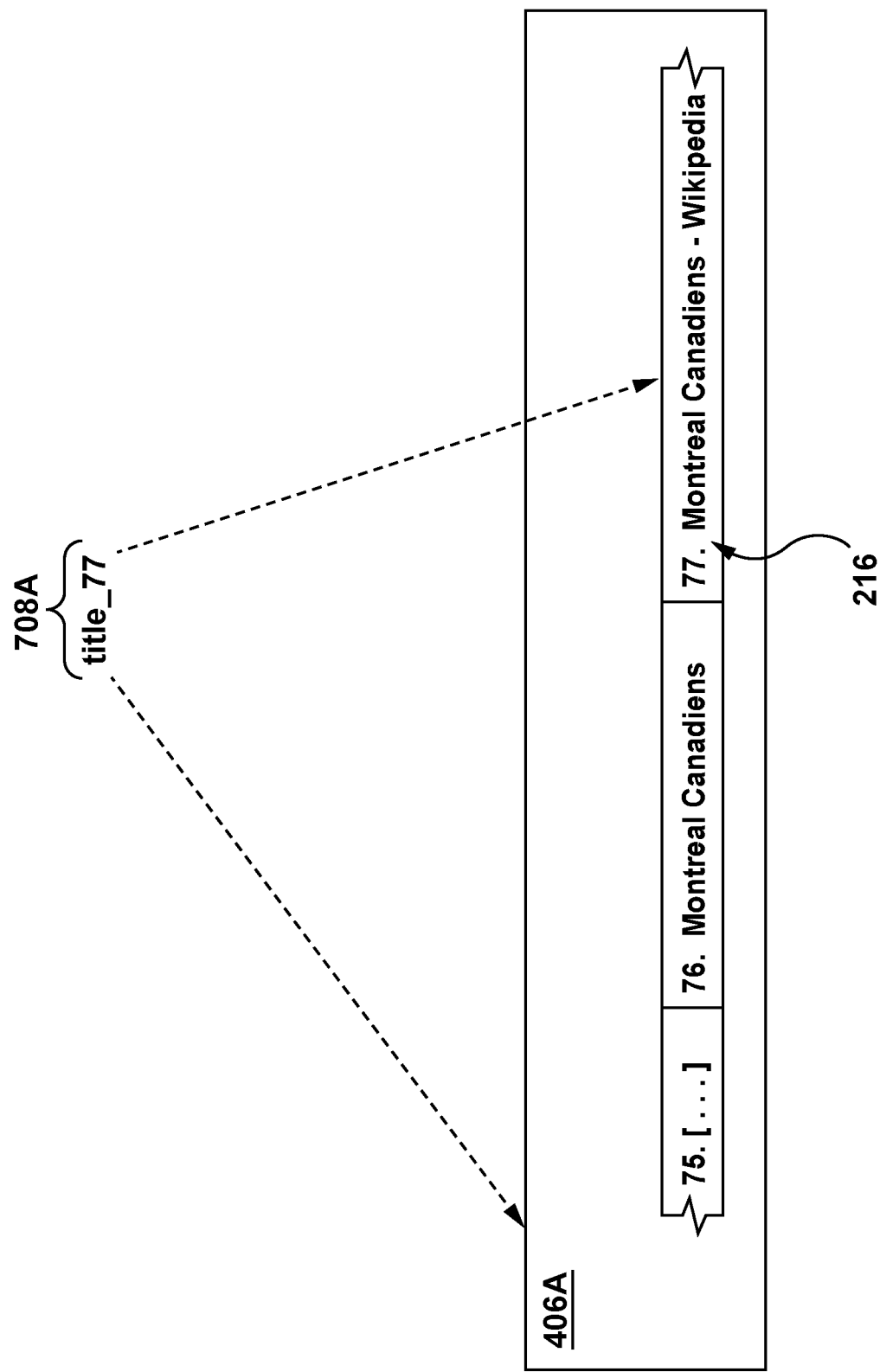
FIG. 12 depicts an example of a process of retrieving title elements stored within the title elements index of offline query result database stored within the electronic device of FIG. 9.

With brief reference to FIG. 12, there is depicted a non-limiting embodiment of retrieving the title 216 using the first element pointer 708A. As stated previously, the first element pointer 708A ("Title_77") comprises the first pointer reference that allows the database builder application 326 to access the title elements index 406A, and the second pointer reference that allows the database builder application 326 to access and retrieve the title 216 based on the first SERP element position value 612. In other word, the first element pointer 708A is the absolute reference to the entry of the title 216.

Returning to FIG. 10, the retrieval process of the SERP elements is done until arriving to the end of the first list 712, as determined above.

In some embodiments, after retrieving the SERP element associated with the fourth element pointer 708D and during processing of the subsequent fifth element pointer (not numbered), the offline SERP building application 332 is configured to determine that the element pointers 708A-708D together form the first search result 208. This determination is due to the fact the fifth element pointer (not numbered) is directed to the title elements index 406A, which has been previously accessed by the first element pointer 708A.

Once the entire SERP elements associated with the element pointers of the first list 712 have been retrieved, the offline SERP building application 332 is configured to compile the retrieved SERP elements in the retrieved order.

Figure 13:
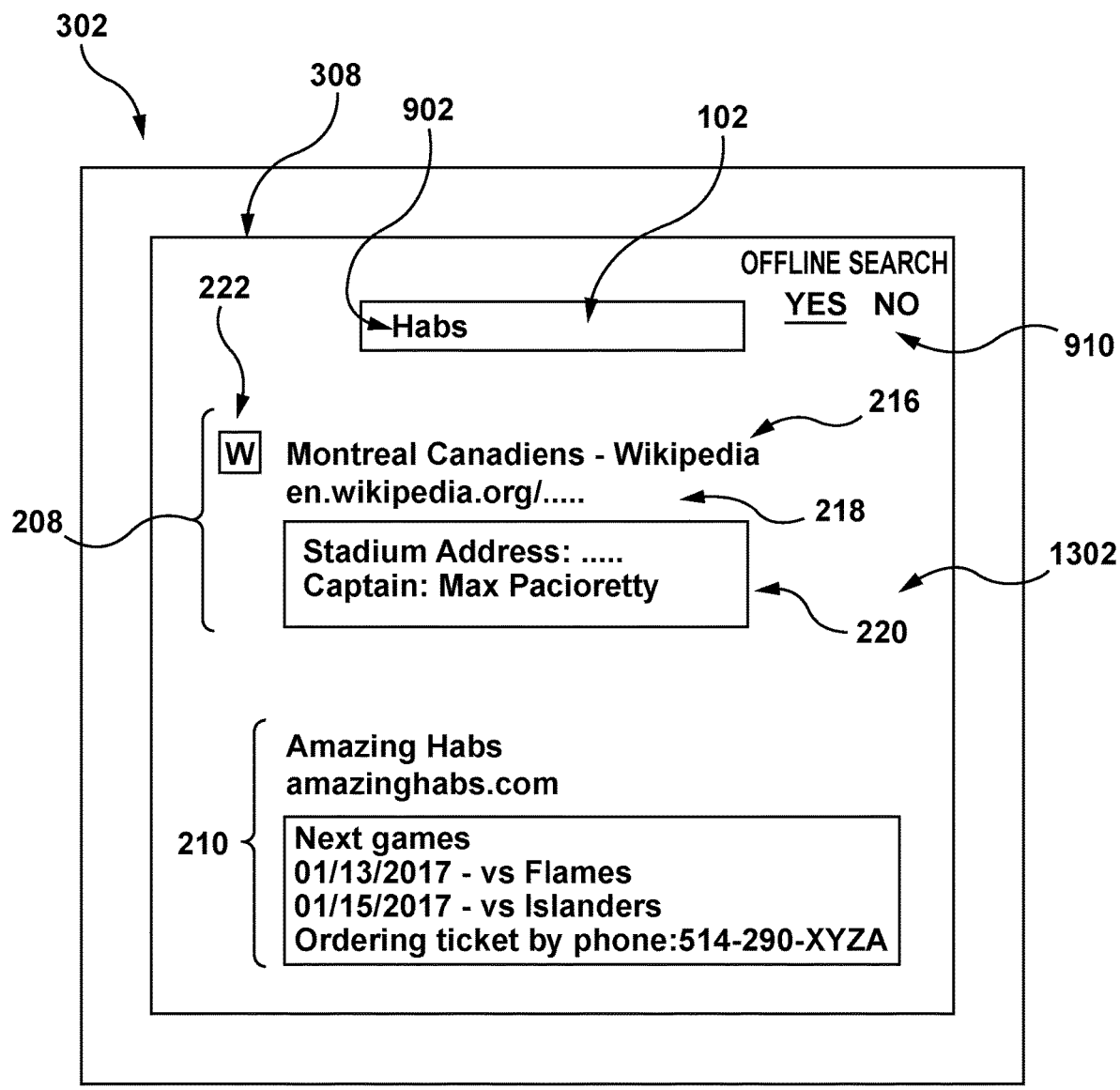
FIG. 13 depicts a screen shot of an offline SERP generated in accordance with non-limiting embodiments of the present technology.

Referring to FIG. 13, there is provided a non-limiting example of an offline SERP 1302 that is generated in response to the new search query 902. The offline SERP 1302 displays the first search result 208 and the second search result 210. Each of the first and second results 208, 210 is a result of the compilation of the SERP elements stored within the SERP elements indexes 406 that were retrieved using the element pointers comprising the first list 712.

In some embodiments of the present embodiment, the search application 308 is configured to, in parallel to generating the offline SERP 1302, configured in attempting to load additional search results (such as the third search result 212) from the server 314. In some embodiments, if connection is restored (or improved), and the additional search results have been received by the server 314, the search application is configured to add, or prompt the user to refresh the offline SERP 1302 to display the additionally received search results.

Figure 14:
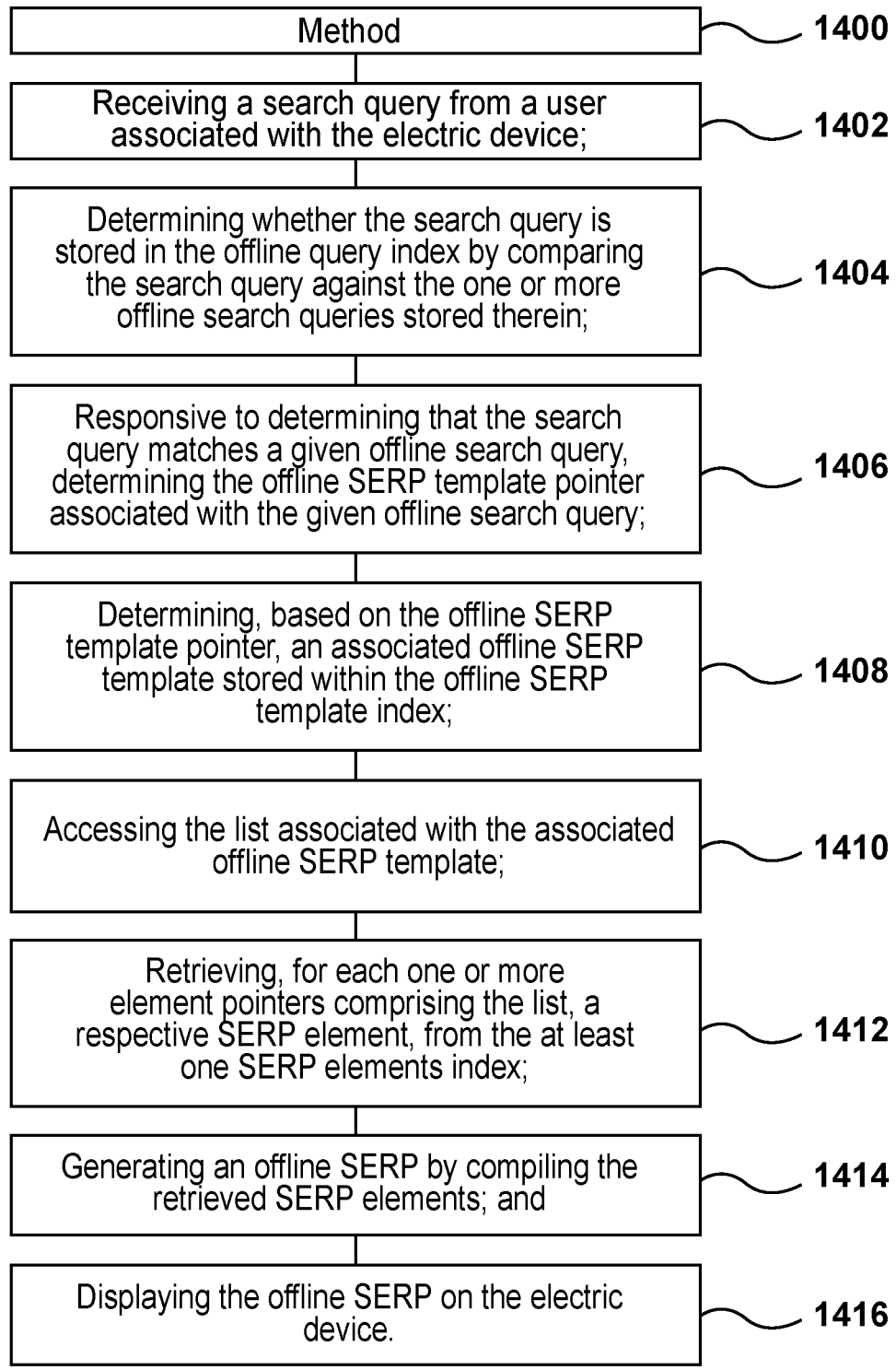
FIG. 14 depicts a flow chart of a method of generating an offline SERP being executable by the electronic device of the system of FIG. 1, the method being executed in accordance with non-limiting embodiments of the present technology.

Given the architecture and examples provided herein above, it is possible to execute a computer-implemented method of generating an offline SERP. With reference to FIG. 14, there is depicted a flow chart of a method 1400, the method 1400 being executable in accordance with non-limiting embodiments of the present technology. The method 1400 can be executed by the electronic device 302.

Step 1402—Receiving a Search Query from a User Associated with the Client Device.

The method 1400 starts at step 1402, where the search application 308 of the electronic device 302 receives the new search query 902.

The method 1400 will be explained below with reference to one scenario. It should be understood that the scenario presented herein below is for illustration purposes only, and the present technology is in no way to be limited based on the scenario presented below.

The search application 308 receives a new search query 902 from the user associated with the electronic device 302. It is assumed that the new search query 902 is the query "habs".

Step 1404—Determining Whether the Search Query is Stored in the Offline Query Index by Comparing the Search Query Against the One or More Offline Search Queries Stored Therein.

At step 1404, the offline SERP building application 332 is configured to determine whether the new search query 902 corresponds to one of the one or more stored search queries 510 stored within the offline query index 402.

The offline SERP building application 332 is configured to determine whether the new search query 902 corresponds to one of the one or more stored search queries 510 stored within the offline query index 402.

Step 1406—Responsive to Determining that the Search Query Matches a Given Offline Search Query, Determining the Offline SERP Template Pointer Associated with the Given Offline Search Query.

At step 1406, upon determining that the new search query 902 matches one of the one or more search queries within the offline query index 402, the offline SERP building application 332 is configured to determine the offline SERP template pointer 508 associated with the given offline search query.

Upon determining that the new search query 902 corresponds to the second search query 504 stored within the offline query index 402, the offline SERP building application 332 determines that the associated offline SERP template pointer is the second offline SERP template pointer 508B.

Step 1408—Determining, Based on the Offline SERP Template Pointer, an Associated Offline SERP Template Stored within the Offline SERP Template Index.

At step 1408, the offline SERP building application 332 is configured to determine the offline SERP template that is associated with the previously determined offline SERP template pointer.

Based at least on the second offline SERP template pointer 508B, the offline SERP building application 332 is configured to determine the length of the offline SERP template associated with the new search query, which corresponds to the first list 712 of the offline SERP template index 408.

Step 1410—Accessing the List Associated with the Associated Offline SERP Template.

At step 1410, the offline SERP building application 332 is configured to retrieve the list comprising a subset of one or more element pointers 702 that form the associated offline SERP template.

Having determined the length of the first list 712 within the offline SERP template index 408, the offline SERP building application 332 is configured to access the first list 712.

Step 1412—Retrieving, for Each One or More Element Pointers Comprising the List, a Respective SERP Element, from the at Least One SERP Elements Index.

At step 1412, the offline SERP building application 332 is configured to, based on the one or more element pointers 702 that comprise the list, access and retrieve the associated SERP elements from the SERP element indexes 406.

Based on the pointer references contained within the first element pointer 708A of the first list 712, the offline SERP building application 332 is configured to access the title elements index 406A and retrieve the first title 216. Once the first title 216 is retrieved, the offline SERP building application 332 is configured to retrieve the subsequent SERP element associated with the second element pointer 708B, until retrieving all the SERP elements associated with the first list 712.

Step 1414—Generating an Offline SERP by Compiling the Retrieved SERP Elements.

At step 1414, the offline SERP building application 332 is configured to compile the retrieved SERP elements.

Upon retrieving each of the SERP elements from the SERP element indexes 406 based on the element pointers contained within the first list 712, the offline SERP building application 332 is configured to compile the so retrieved SERP elements to generate the offline SERP 1302.

Step 1416—Displaying the Offline SERP on the Client Device.

At step 1416, the offline SERP building application 332 is configured to cause the search application 308 to display the offline SERP 1302.

The offline SERP 1302 is displayed on the electronic device 302 via the search application 308.

It should be understood that unlike the conventional method of generating a SERP which comprises retrieving a search result and determining a position of display (by using, for example, the ranking application 320), the present technology is directed at generating an offline SERP by obtaining a specific search result for a given position (by the use of the element pointers 702).

One of the main aims of the present technology is to achieve proper coverage of the many potential search queries that the user may enter in the query interface 102. For instance, by eliminating duplicate SERP elements by only storing one SERP element within the one or more SERP element indexes 406 that may be retrieved by the one or more SERP templates, more offline search queries (and corresponding SERPs) could be stored within the electronic device 302 via the offline query result database 328.

Yet another aim of the present technology is to efficiently generate the offline SERP with a reduced computation capacity requirements by the electronic device 302. By storing SERP elements in different indexes (such as the title elements index 406A) and retrieving them via pointers, the present technology not only allows better coverage, but also provides efficient use of computational resources in generating the offline SERP.

Another aim of the present technology is to reduce the network traffic by allowing the user to find information without requesting access to the server 314. For example, in a situation where the user is on his way to a well-known restaurant but has forgotten the address to it, the user may actuate the actuator 910 and type the name of the restaurant within the query interface 102 and launch a search. As a result, it is contemplated that within the generated offline SERP, information relevant to the user may be displayed (since the snippets or object cards displayed within the offline SERP will likely contain address information or contact information of the institution).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

Embodiments of the present technology can be summarized as follows, expressed in numbered clauses.

CLAUSE 1. A method (1400) of processing a search query, the method executable at an electronic device (302), the electronic device (302) storing, in its permanent storage (306), an offline query result database (328), the offline query result database (328) comprising:
a. an offline query index (402) storing one or more offline search queries (510), each of the one or more offline search queries (510) being associated with a respective offline search engine result page (SERP) template pointer (508);
b. an offline SERP template index (408) storing one or more offline SERP templates (712, 714), each of the one or more offline SERP templates (712, 714) comprising a list of one or more ordered element pointers (702);
c. at least one SERP elements index (406) storing a plurality of SERP elements (604), each SERP element associated to at least one of the one or more element pointers (702), the plurality of SERP elements (604) having been organized by a respective SERP element type;
  the method (1400) comprising:
a. receiving (1402) a search query (902) from a user associated with the electronic device (302);
b. determining (1404) whether the search query (902) is stored in the offline query index (402) by comparing the search query (902) against the one or more offline search queries (510) stored therein;
c. responsive (1406) to determining that the search query (902) matches a given offline search query (504), determining the offline SERP template pointer (508B) associated with the given offline search query (504);
d. determining (1408), based on the offline SERP template pointer (508B), an associated offline SERP template (712) stored within the offline SERP template index (408);
e. accessing (1410) the list associated with the associated offline SERP template (712);
f. retrieving (1412), for each one or more element pointers (708A, 708B, 708C, 708D) comprising the list, a respective SERP element (116), from the at least one SERP elements index (406);
g. generating (1414) an offline SERP (1302) by compiling the retrieved SERP elements; and
h. displaying (1416) the offline SERP (132) on the electronic device (302).

CLAUSE 2. The method of CLAUSE 1, wherein the one or more offline search queries (510) are stored in an alphabetically sorted array, and further clustered into one or more offline search query clusters (506) each comprising a subset of the stored offline search queries (510) starting with the same first N characters.

CLAUSE 3. The method of any of the CLAUSES 1 to 2, wherein the offline query result database (328) further comprises a partial offline query index (410) storing one or more unique sets of characters (802) generated based on the first N characters of the one or more offline search queries (510), each of the one or more unique sets of characters (802) being associated with a respective query cluster pointer (804).

CLAUSE 4. The method of CLAUSE 3, wherein prior to determining whether the search query (902) is stored in the offline query index (402), the method further comprises:
a. parsing a portion (1002) of the search query (902), the portion comprising the first N characters of the search query (902);
b. determining whether the portion (1002) is stored within the partial offline query index (410) by comparing the portion (1002) against the one or more set of characters (802);
c. responsive to determining that the portion (1002) matches a given set of characters (802A), determining the associated query cluster pointer (804A); and
d. accessing a given offline search query cluster (506B) based on the given query cluster pointer (804A).

CLAUSE 5. The method of CLAUSE 4, wherein determining whether the search query (902) is stored in the offline query index (402) comprises determining whether the search query (902) is stored within the given offline search query cluster (506B).

CLAUSE 6. The method of any of the CLAUSES 1 to 5, wherein:
a. each of the one or more offline search queries (510) has a unique query position value (516) within the offline query index (402);
b. each of the one or more SERP templates (712, 714) corresponds to a respective offline search query (510); and
c. each of the one or more SERP templates (712, 714) is stored within the offline SERP template index (408) in an order determined based on the query position value (516) of the respective offline search query (510).

CLAUSE 7. The method of CLAUSE 6, wherein each of the one or more element pointers (708A, 708B, 708C, 708D) of the associated SERP template (712) has a unique element pointer position value (716) within the offline SERP template index (408).

CLAUSE 8. The method of CLAUSE 7, wherein the associated offline SERP template (712), comprises at least two element pointers (708A, 708B, 708C, 708D) each associated with respective SERP elements (216), one of the at least two element pointers having a lowest element pointer position (716) within the associated offline SERP template (408), and another one of the at least two element pointers having a highest element pointer position value (716) within the associated offline SERP template (408).

CLAUSE 9. The method of CLAUSE 8, wherein the offline SERP template pointer (508B) comprises an indication of the element pointer (708A) having the lowest position value (716A) within the associated offline SERP template (408).

CLAUSE 10. The method of CLAUSE 9, wherein retrieving the respective SERP element comprises sequentially retrieving the respective SERP elements starting from the respective SERP element associated with the element pointer having the lowest position value (716) and finishing after retrieving the respective SERP element associated with the associated with the element pointer having the highest position value (716).

CLAUSE 11. The method of CLAUSE 10, wherein compiling the retrieved SERP elements comprises sequentially compiling the SERP element (216) associated with the element pointer (708A) having the lowest position value (716) until the SERP element associated with the element pointer having the highest position value (716).

CLAUSE 12. The method of CLAUSE 11, the at least one SERP elements index (406) index comprises a plurality of SERP elements indexes (406A, 406B, 406C, 406D), each of the plurality of SERP elements indexes storing SERP elements (604) of a specific one of the respective SERP element type.

CLAUSE 13. The method of CLAUSE 12, wherein the plurality of SERP element indexes comprise:
a. a uniform resource locator elements index (406B);
b. a title elements index (406A);
c. a snippet elements index (406C); and
d. a favicon element index (406D).

CLAUSE 14. The method of any of the CLAUSES 1 to 13, wherein the offline query result database (328) has been generated and pre-loaded into the permanent storage (306) by a search engine server (314) via a communication network (312) prior to execution of the method (1400).

CLAUSE 15. The method of CLAUSE 14, wherein the offline query result database (328) has been generated based on SERPs previously generated by the search engine server (314) based on third-party users' search queries.

CLAUSE 16. The method of CLAUSE 14, wherein the offline SERP template index (408) stores a pre-defined number of offline SERP templates, the pre-defined number having been determined by an operator of the search engine server (314) to satisfy a certain number of search queries from the user.

CLAUSE 17. The method of CLAUSE 14, wherein each offline SERP template includes a pre-defined number of element pointers.

CLAUSE 18. The method of CLAUSE 14, wherein the one or more offline SERP templates (712, 714) comprises a first offline SERP template (712) and a second offline SERP template (714), the number of element pointers (702) of the first offline SERP template (712) being different from the number of element pointers (702) of the second offline SERP template (714).

CLAUSE 19. The method of any of the CLAUSES 1 to 18, wherein determining whether the search query is stored within the search query index is in response to determining that:

a. there is no connection between the electronic device (302) and a search engine server (314) to which the electronic device (302) is coupled to via a communication network (312); or
b. there is a slow connection between the electronic device (302) and the search engine server (314).

CLAUSE 20. An electronic device (302) configured to process a search query, the electronic device (302) comprising:
an offline query result database (328) stored in a permanent storage (306), the offline query result database (328) comprising:
a. an offline query index (402) storing one or more offline search queries (510), each of the one or more offline search queries (510) being associated with a respective offline search engine result page (SERP) template pointer (508);
b. an offline SERP template index (408) storing one or more offline SERP templates (712, 714), each of the one or more offline SERP templates (712, 714) comprising a list of one or more ordered element pointers (702);
c. at least one SERP elements index (406) storing a plurality of SERP elements (604), each SERP element associated to at least one of the one or more element pointers (702), the plurality of SERP elements (604) having been organized by a respective SERP element type;
at least one computer processor (304) configured to execute the method of any one of CLAUSES 1 to 19.

What is claimed is:
1. A method of processing a search query, the method executable at an electronic device, the electronic device storing, in its permanent storage, an offline query result database that has been generated and pre-loaded into the permanent storage by a search engine server via a communication network prior to execution of the method, the offline query result database comprising:
an offline query index storing one or more offline search queries, each of the one or more offline search queries being associated with a respective offline search engine result page (SERP) template pointer;
an offline SERP template index storing one or more offline SERP templates, each of the one or more offline SERP templates comprising a list of one or more element pointers, the one or more offline SERP templates comprising a pre-defined number of offline SERP templates, the pre-defined number having been determined by an operator of the search engine server to satisfy a certain number of search queries from a user;
at least one SERP elements index storing a plurality of SERP elements, each SERP element associated to at least one of the one or more element pointers, the plurality of SERP elements having been organized by a respective SERP element type;
the method comprising:
receiving a search query from the user associated with the electronic device;
determining whether the search query is stored in the offline query index by comparing the search query against the one or more offline search queries stored therein;
responsive to determining that the search query matches a given offline search query, determining the offline SERP template pointer associated with the given offline search query;
determining, based on the offline SERP template pointer, an associated offline SERP template stored within the offline SERP template index;

accessing the list associated with the associated offline SERP template;

retrieving, for each one or more element pointers of the list, a respective SERP element, from the at least one SERP elements index;

generating an offline SERP by compiling the retrieved SERP elements; and displaying the offline SERP on the electronic device.

2. The method of claim 1, wherein the one or more offline search queries are stored in an alphabetically sorted array and further clustered into one or more offline search queries clusters each comprising a subset of the stored offline search queries starting with the same first N characters.

3. The method of claim 2, wherein the offline query result database further comprises a partial offline query index storing one or more unique sets of characters generated based on the first N characters of the one or more offline search queries, each of the one or more unique sets of characters being associated with a respective query cluster pointer.

4. The method of claim 3, wherein prior to determining whether the search query is stored in the offline query index, the method further comprises:

parsing a portion of the search query, the portion comprising the first N characters of the search query;

determining whether the portion is stored within the partial offline query index by comparing the portion against the one or more sets of characters;

responsive to determining that the portion matches a given set of characters, determining the associated query cluster pointer; and accessing a given offline search query cluster based on the given query cluster pointer.

5. The method of claim 4, wherein determining whether the search query is stored in the offline query index comprises determining whether the search query is stored within the given offline search query cluster.

6. The method of claim 1, wherein:

each of the one of more offline search queries has a unique query position value within the offline query index;

each of the one or more SERP templates corresponds to a respective offline search query; and each of the one or more SERP templates is stored within the offline SERP template index in an order determined based on the query position value of the respective offline search query.

7. The method of claim 6, wherein each of the one or more element pointers of the associated SERP template has a unique element pointer position value within the offline SERP template index.

8. The method of claim 7, wherein the associated offline SERP template comprises at least two element pointers each associated with respective SERP elements, one of the at least two element pointers having a lowest element pointer position value within the associated offline SERP template, and another one of the at least two element pointers having a highest element pointer position value within the associated offline SERP template.

9. The method of claim 8, wherein the offline SERP template pointer comprises an indication of the element pointer having the lowest position value within the associated SERP template.

10. The method of claim 9, wherein retrieving the respective SERP element comprises sequentially retrieving the respective SERP elements starting from the respective SERP element associated with the element pointer having the lowest position value and finishing after retrieving the respective SERP element associated with the associated with the element pointer having the highest position value.

11. The method of claim 10, wherein compiling the retrieved SERP elements comprises sequentially compiling the SERP element associated with the element pointer having the lowest position value until the SERP element associated with the element pointer having the highest position value.

12. The method of claim 1, wherein the at least one SERP elements index comprises a plurality of SERP elements indexes, each of the plurality of SERP elements indexes storing SERP elements of a specific one of the respective SERP element type.

13. The method of claim 12, wherein the plurality of SERP element indexes comprise:

a uniform resource locator elements index;

a title elements index;

a snippet elements index;

a favicon elements index; and an image elements index.

14. The method of claim 1, wherein the offline query result database has been generated based on SERPs previously generated by the search engine server based on third-party users' search queries.

15. The method of claim 1, wherein each offline SERP template includes a pre-defined number of element pointers.

16. The method of claim 1, wherein the one or more offline SERP templates comprises a first offline SERP template and a second offline SERP template, the number of element pointers of the first offline SERP template being different from the number of element pointers of the second offline SERP template.

17. The method of claim 1, wherein determining whether the search query is stored within the search query index is in response to determining that:

there is no connection between the electronic device and a search engine server to which the electronic device is coupled to via a communication network; or there is a slow connection between the electronic device and the search engine server.

18. An electronic device configured to process a search query, the electronic device comprising:

an offline query result database stored in a permanent storage, the offline query result database having been pre-loaded into the permanent storage by a search engine server via a communication network, the offline query result database comprising:

an offline query index storing one or more offline search queries, each of the one or more offline search queries being associated with a respective offline search engine result page (SERP) template pointer;

an offline SERP template index storing one or more offline SERP templates, each of the one or more offline SERP templates comprising a list of one or more element pointers, the one or more offline SERP templates comprising a pre-defined number of offline SERP templates, the pre-defined number having been determined by an operator of the search engine server to satisfy a certain number of search queries from a user;

at least one SERP elements index storing a plurality of SERP elements, each SERP element associated to at least one of the one or more element pointers, the plurality of SERP elements having been organized by a respective SERP element type;

at least one computer processor configured to:

receive a search query from a user associated with the electronic device;

determine whether the search query is stored in the offline query index by comparing the search query against the one or more offline search queries stored therein;

responsive to determining that the search query matches a given offline search query, determine the offline SERP template pointer associated with the given offline search query;

determine, based on the offline SERP template pointer, an associated offline SERP template stored within the offline SERP template index;

accessing the list associated with the associated offline SERP template;

retrieve, for each one or more element pointers comprising the list, a respective SERP element, from the at least one SERP elements index;

generate an offline SERP by compiling the retrieved SERP elements; and display the offline SERP on the electronic device.

* * * * *

UNITED STATES PATENT AND TRADEMARK OFFICE
CERTIFICATE OF CORRECTION

PATENT NO.          : 10,713,308 B2
APPLICATION NO.     : 15/785719
DATED               : July 14, 2020
INVENTOR(S)         : Roman Vladimirovich Khalkechev et al.

It is certified that error appears in the above-identified patent and that said Letters Patent is hereby corrected as shown below:

On the Title Page

Column 1, item (72), Inventors, Line 2, delete "Kommunaraka" and insert --Kommunarka--

In the Claims

Column 30, Lines 1-2, Claim 10 delete "SERP element associated with the associated with the element pointer" and insert --SERP element associated with the element pointer--

Signed and Sealed this
Twenty-second Day of December, 2020

Andrei Iancu
*Director of the United States Patent and Trademark Office*